United States Patent Office 3,405,139
Patented Oct. 8, 1968

3,405,139
PHENYL-CYCLOHEXYLALKYLAMINE COMPOUNDS
Erich Haack, Heidelberg, Alfred Popelak, Mannheim, Gustav Lettenbauer, Lampertheim, Hesse, Wolfgang Schaumann, Mannheim-Waldhof, and Klaus Ritter, Mannheim, Germany, assignors to C. F. Boehringer & Soehne GmbH, Mannheim-Waldhof, Germany, a corporation of Germany
No Drawing. Continuation-in-part of application Ser. No. 436,653, Mar. 2, 1965. This application Mar. 16, 1966, Ser. No. 534,635
Claims priority, application Germany, Apr. 1, 1965, B 81,257; Apr. 17, 1965, B 81,504
16 Claims. (Cl. 260—340.5)

ABSTRACT OF THE DISCLOSURE

Novel phenyl-cyclohexylalkylamines and their acid addition salts of the formula

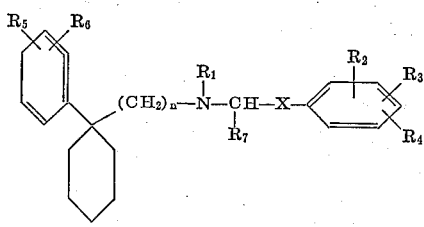

wherein $R_1$ is hydrogen or lower alkyl, $R_2$, $R_3$, $R_4$, $R_5$ and $R_6$ are hydrogen, halogen, hydroxyl, lower alkyl, aralkoxy or alkoxy and wherein two adjacent groups $R_2$–$R_6$ together form a methylene-dioxy radical, X is lower alkylene which may be substituted by hydroxyl and/or keto groups and/or interrupted by a hetero atom, $R_7$ is hydrogen or lower alkyl and $n$ is 2 or 3.

The compounds as above set out and chemotherapeutic agents and constitute particularly valuable coronary artery dilating agents.

---

This invention relates to new phenyl-cyclohexylalkylamine compounds. This application is a continuation-in-part of application Ser. No. 436,510, filed Mar. 2, 1965, which in turn represents a continuation-in-part of application Ser. No. 343,510, filed Feb. 10, 1964.

More particularly, the invention relates to a new class of phenyl-cyclohexylalkylamines of the formula:

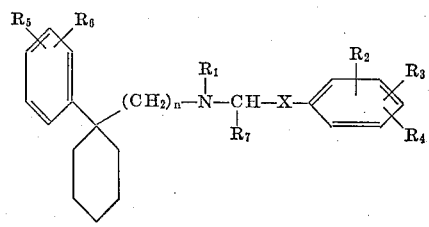

where $R_1$ is hydrogen or a lower alkyl radical, $R_2$, $R_3$, $R_4$, $R_5$, and $R_6$, which may be the same or different, are hydrogen, halogen, hydroxyl, lower alkyl, aralkoxy or alkoxy radicals and wherein two adjacent groups $R_2$–$R_6$ together form a methylene-dioxy radical, X is a lower, straight or branched chain alkylene radical which may be substituted by hydroxyl and/or keto groups and/or interrupted by a hetero atom, $R_7$ is hydrogen or a lower alkyl radical, and $n$ is 2 or 3.

The products of the invention can be obtained in the free base form having the formula given above or in the form of one of their acid addition salts with inorganic or organic acids. Some examples of these salts are the hydrochloride, hydrobromide, hydroiodide, sulfate, phosphate, citrate, acetate, tartrate, lactate, maleate, oxalate, and the like.

It has been found that the products of the invention are of great therapeutic value and constitute coronary artery dilating agents. They are particularly effective and can be used with advantage as medicaments where coronary dilating agents are indicated. These new phenyl-cyclohexylalkylamine compounds may be administered in the form of their free bases or as one of their acid addition salts.

The new phenyl-cyclohexylalkylamines can be produced by conventional methods. The new products can be prepared by reducing an (a) Amine of the formula

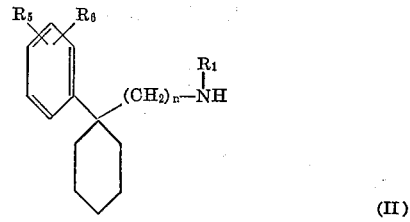

wherein $R_1$, $R_5$, $R_6$, and $n$ have the same significance as given above, with a phenylpropanone of the formula

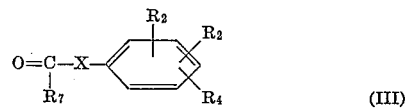

where $R_2$, $R_3$, $R_4$, X and $R_7$ have the same significance as above, or by reacting an (b) Amine of Formula II (above) with a halide of the formula

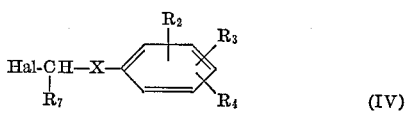

where $R_2$, $R_3$, $R_4$, X and $R_7$ have the same significance as given above, and Hal is a halogen atom, or with the corresponding epoxides.

If desired, an acid binding agent, i.e., a hydrogen halide-binding agent may be employed in the reaction, or an (c) Amine of the general formula

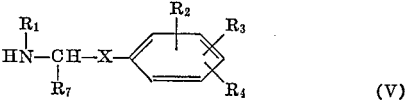

where $R_1$, $R_2$, $R_3$, $R_4$, X and $R_7$ have the same significance as given above, is reacted with a halide of the formula

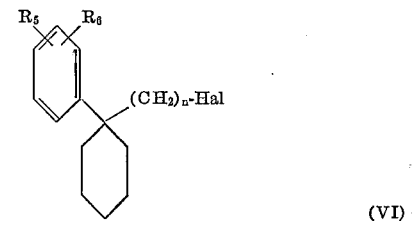

where $R_5$, $R_6$, Hal, and $n$ are as above defined, again if desired in the presence of a hydrogen halide acid binding agent, or, alternatively, a (d) Carboxylic acid amide of the formula

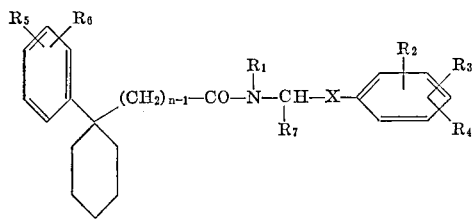

(VII)

where $R_1$, $R_2$, $R_3$, $R_4$, $R_5$, $R_6$, $R_7$, X and $n$ have the same significance as given above, is reduced to the corresponding amine.

The new compounds according to the present invention can also be prepared by reducing an aldehyde of the formula

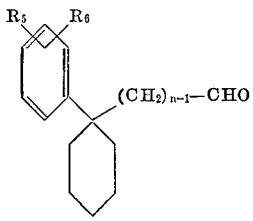

(VIII)

in which $R_5$, $R_6$ and $n$ are as above defined, with a 1-phenylalkylamine of the formula

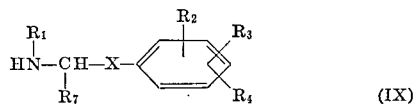

(IX)

wherein $R_1$, $R_2$, $R_3$, $R_4$, $R_7$, and X have the same meanings as given above.

In the case of this reaction, the amine of general Formula V can also first be reacted with the aldehyde of general Formula VIII and the condensation product obtained subsequently reduced. The reduction is, in any case, brought about by catalytic hydrogenation or by means of nascent hydrogen, for example, with sodium amalgam, lithium aluminum hydride or sodium borohydride, or else electrolytically. For carrying out the catalytic reduction, there are used the known catalysts, for example, noble metal catalysts, nickel catalysts or Raney catalysts. The reaction is carried out in the usual solvents, for example, alcohols or aqueous alcohols.

Furthermore, the new compounds according to the present invention where $R_7$ is a hydrogen atom can also be prepared by reducing an acid amide of the formula

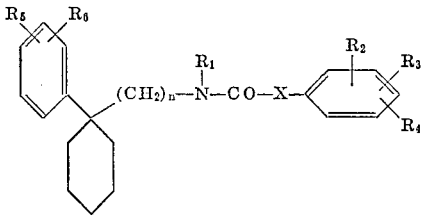

(X)

wherein $R_1$, $R_2$, $R_3$, $R_4$, $R_5$, $R_6$, X and $n$ have the same meanings as given above to the corresponding amine.

The compounds can be converted to their therapeutically useful salts in the conventional manner by, for example, treatment with an ethereal solution of a pharmacologically acceptable acid.

In the method a above, the amine of Formula II can also first be converted with a phenylpropanone of Formula III and the condensation product thus obtained thereafter reduced. The reduction is performed in any case by catalytic hydrogenation, or by means of nascent hydrogen, as for example with sodium amalgam, lithium-aluminum hydride or sodium-boron hydride. Alternatively, the reduction can be carried out electrolytically. The conventional catalysts are suitable for use in the catalytic reduction and include the noble metal catalysts, nickel catalysts or Raney catalysts in the usual solvents such as, for example, alcohols or aqueous alcohols.

In the conversion of the amines having Formula II by reaction with the halides having Formula IV or of the amines of Formula V with the halides of Formula VI, it is advantageous to use a second mol of the amine in order to bind the hydrogen halide that is split off. However, other conventional materials can also be used as hydrogen halide binding agents, such as, for example, alkali or alkaline-earth metal hydroxides or carbonates, as well as organic bases such as pyridine and triethylamine. The conversion is conducted in the presence of a solvent, such as for instance aromatic hydrocarbons, ethers, cyclic ethers and halogenated hydrocarbons.

The reduction of the carboxylic acid amides having Formula VII is conducted by means of complex metal hydrides as, for instance, lithium-aluminum hydride in the presence of a suitable solvent as, for example, ether, tetrahydrofuran, or the like.

The subsequent N-alkylation of the products having the Formula I (where $R_1$ is hydrogen) can be conducted using the conventional methods, as for example by catalytic hydrogenation carried out in the presence of a suitable aldehyde, by acylation followed by reduction using complex metal hydrides or by conversion with the corresponding alkyl halide.

If $R_2$–$R_6$ are alkoxy or aralkoxy radicals, the products can be converted to the corresponding hydroxy compounds in the conventional manner, as for example by heating with hydrobromic acid or aluminum chloride, or by catalytic hydrogenation.

The free bases can be converted to their corresponding salts, in the conventional manner as for example by taking the base up in ether and treating the solution with an inorganic or organic acid, as, for example, hydrohalic acid, lactic acid, maleic acid, tartaric acid or citric acid, acetic acid, phosphoric acid or sulfuric acid.

The following examples illustrate in more detail the present invention without, however, limiting it thereto.

EXAMPLE 1

1-[3'-(phenylisopropylamino)-propyl]-1-phenylcyclohexane (a) 7.3 g. N-1'-phenylisopropyl-$\beta$-(1-phenylcyclohexyl)-propionic acid amide having a melting point of 91–93° C. (out of n-heptane) were dissolved in a mixture of 80 ml. ether and 40 ml. tetrahydrofuran, and the resulting solution was added dropwise to a suspension of 0.8 g. lithium-aluminum hydride in 00 ml. ether, using agitation. The mixture was thereafter heated for 5 hours under reflux. After the excess lithium-aluminum hydride had been decomposed with a saturated ammonium chloride solution, the aluminum hydroxide was separated and the ether dried. The residue was distilled under high vacuum and resulted in a viscous, almost colorless oil (6 g.) having a boiling point 0.2 of 187–200° C. The distilled base so obtained was dissolved in tetrahydrofuran with a molar quantity of maleic acid and dried. The residue was recrystallized out of isopropanol and had a melting point of 130–133° C.

$C_{24}H_{33}N \cdot C_4H_4O_4$ (451.6).—Calculated, percent: C, 74.46; H, 8.26: N, 3.10. Found, percent: C, 74.41; H, 8.27; N, 3.12.

(b) 10 g. (0.05 mol) 1-phenyl-2-bromopropane were refluxed with 22 g. (0.1 mol 3-(1'-phenylcyclohexyl)-propylamine (boiling point 0.3 of 130–140° C.) in 100 ml.. xylene for 6 hours. The xylene was removed by vacuum distillation and ether was added to the residue, following which the residue was washed repeatedly by shaking with water. After the ether solution had been dried over sodium sulfate, the solution was treated for removal of the ether. The oily residue remaining (16.2 g.) was distilled under high vacuum as in Example 1a, and converted in the usual manner to the corresponding maleinate.

EXAMPLE 2

1-[2'-(phenylisopropylamino)-ethyl]-1-phenylcyclohexane 3.5 g. 2-(1'-phenylcyclohexyl)-ethylamine (boiling point 117–122° C./1 mm. Hg) and 2.9 g. phenylacetone were disolved in 100 ml. benzene and the resulting solution heated on a water bath for 1 hour under reflux, water being separated in this process. After drying over sodium sulfate, the benzene was distilled off in vacuo, the residu dissolved in 50 ml. methanol and 0.7 g. of sodium hydroboride added by increments. The reaction mixture was the allowed to stand for 6 hours at room temperature and thereafter concentrated under vacuum. Following the addition of 200 ml. of water, the mixture was shaken with ether, the ether washed with water and dried over sodium sulfate. The residue (6 g.) obtained by distilling off the ether was purified by further distillation (boiling point 0.1 of 175–190° C.) and thereafter converted to the corresponding maleinate. The maleinate, when recrystallized out of isopropanol, melted at 170–173° C.

$C_{23}H_{31}N \cdot C_4H_4O_4$ (437.6).—Calculated, percent: C, 74.10; H, 8.06; N, 3.20. Found, percent: C, 74.05; H, 8.36; N, 3.22.

EXAMPLE 3

1-[2'-(3'',4''-methylenedioxy-phenylisopropylamino)-ethyl]-1-phenylcyclohexane 5 g. 2-(1'-phenylcyclohexyl)-ethylamine (boiling point 1 of 117–122° C.) and 4.45 g. 3,4-methylenedioxyphenyl-acetone were dissolved in 200 ml. methanol and following a 30 minute period of standing at room temperature, catalytically hydrogenated over 200 ml. $PtO_2$. When the calculated amount of hydrogen had been taken up, the catalyst was filtered out and the methanol removed by vacuum distillation. 9.1 g. of crude 1-[2'-(3'',4''-methylenedioxy-phenylisopropylamino)-ethyl] - 1-phenyl-cyclohexane were thereby obtained as a viscous oil. The maleinate of the base melted, after recrystallization from isopropanol, at 157–159° C.

$C_{24}H_{31}O_2N \cdot C_4H_4O_4$ (481.6).—Calculated, percent: C, 69.83; H, 7.32; N, 2.91. Found, percent: C, 70.24; H, 7.32; N, 3.01.

EXAMPLE 4

1-[3'-(3'',4''-methylenedioxy-phenylisopropylamino)-propyl]-1-phenylcyclohexane

By following substantially the same procedure as set out in Example 1a, 7.8 g. of crude N-1'(3'',4''-methylenedioxy-phenylisopropyl)-β-(1 - phenylcyclohexyl)-propionic acid amide were reduced with 0.8 g. lithium-aluminum hydride in 350 ml. ether. The reduced product was then further processed as set out in Example 1. 7.7 g. of 1 - [3' - (3'',4''-methylenedioxy-phenylisopropylamino)-propyl]-1-phenylcyclohexane in the form of a viscous oil were thereby obtained. The calculated amount of maleic acid in ether was added to a solution of the oil in ether, the precipitated crystals separated by suction filtering and the recovered crystals recrystallized out of isopropanol. The 1 - [3'-(3'',4''-methylenedioxy-phenyliso-propylamino)-1-phenylcyclohexane product obtained melted at 148–150° C.

$C_{25}H_{33}O_2N_2 \cdot C_4H_4O_4$ (495.6).—Calculated, percent: C, 70.28; H, 7.52; N, 2.82. Found, percent: C, 69.98; H, 7.59; N, 2.99.

EXAMPLE 5

1-[3'-(N-methyl-N-3'',4''-methylenedioxy-phenylisopropyl)-aminopropyl]-1-phenylcyclohexane 1.72 g. of the base obtained by the procedure disclosed in Example 4 were hydrogenated together with 1 ml. 40% formalin in 60 ml. methanol over 50 mg. $PtO_2$ until the adsorption of hydrogen had been completed. Following removal of the methanol by distillation, the residue was dissolved in ether, washed with dilute ammonia, dried over sodium sulfate, and using vacuum brought to the dry state. The compound thereby obtained (1.7 g.) was a viscous, colorless oil. The oxalate of the base, when recrystallized out of a mixture of isopropanol and methylene chloride, melted at 141–143° C.

$C_{26}H_{35}O_2N \cdot C_2H_2O_4$ (483.6)—Calculated, percent: C, 69.54; H, 7.71; N, 2.89. Found, percent: C, 69.48; H, 7.72; N, 2.94.

EXAMPLE 6

1-[3'-(p-benzyloxyphenylisopropylamino)-propyl]-1-phenylcyclohexane

Following a procedure analogous to that of Example 2, 3 g. 3-(1'-phenylcyclohexyl)-propylamine and 3.47 g. p-benzyloxyphenyl-acetone were reduced with sodium hydroboride and further processed. The very viscous ether residue (6.25 g.) which resulted was taken up in ether and acidified with ethereal hydrochloric acid, and the precipitated hydrochloride recrystallized from a mixture of isopropanol and methylene chloride. The salt thus obtained melted at 153–155° C.

$C_{31}H_{39}NO \cdot HCl$ (478.1)—Calculated, percent: C, 77.87; H, 8.44; N, 2.93; Cl, 7.42. Found, percent: C, 78.09; H, 8.76; N, 2.96; Cl, 7.84.

EXAMPLE 7

1-[2'-(p-benzyloxyphenylisopropylamino)-ethyl]-1-phenylcyclohexane 4.6 g. 2-(1'-phenylcyclohexyl)-ethylamine and 4.6 g. p-benzyloxyphenyl-acetone were reduced with sodium hydroboride and further processed, analogous to Example 2. The very viscous ether residue (8.8 g.) thereby obtained was dissolved in ether, the calculated quantity of maleic acid then added, and the precipitated maleinate recrystallized from isopropanol. The melting point of the maleinate was 165–168° C.

$C_{30}H_{37}NO \cdot C_4H_4O_4$ (543.66)—Calculated, percent: C, 75.10; H, 7.60; N, 2.58. Found, percent: C, 75.26; H, 7.35; N, 2.65.

EXAMPLE 8

1-[2'-(p-hydroxyphenylisopropylamino)-ethyl]-1-phenylcyclohexane 2.2 g. of 1-[2'-(p-benzyloxyphenylisopropylamino)-ethyl]-1-phenylcyclohexane base obtained as disclosed in Example 7 were dissolved in 50 ml. methanol and, after the addition of 2.7 ml. normal hydrochloric acid, hydrogenated over 100 mg. palladium charcoal until hydrogen absorption had ended. Following removal of the catalyst by suction filtering, the solution was diluted with 20 ml. water and the methanol removed by vacuum distillation. The hydrochloride which thereupon separated out (1.7 g.) was suction filtered and recrystallized from methanol. The hydrochloride had a melting point of 259–261° C.

$C_{23}H_{29}NO \cdot HCl$ (371.95)—Calculated, percent: C, 74.27; H, 8.13; N, 3.77; Cl, 9.53. Found, percent: C, 74.15; H, 8.44; N, 3.69; Cl, 9.42.

EXAMPLE 9

1-[3'-(3'',4''-dimethoxyphenylisopropylamino)-propyl]-1-phenylcyclohexane 8.5 g. 3-(1'-phenylcyclohexyl)-propylamine and 8.1 g. 3,4-dimethoxyphenylacetone were reduced with sodium hydroboride in an analogous procedure to that set out in Example 2. The viscous crude base thereby obtained (15.6 g.) was purified chromatographically on 200 g. aluminum oxide, with ether as the solvent. The purified base comprised a viscous, colorless oil. The oxalate of the base melted following recrystallization from a mixture of isopropanol and methylene chloride at 180–182° C.

$C_{26}H_{37}NO_2 \cdot C_2H_2O_4$ (485.6)—Calculated, percent: C, 69.25; H, 8.10; N, 2.88. Found, percent: C, 69.24; H, 7.84; N, 3.20.

EXAMPLE 10

1-[3'-(4"-methylphenyl-isopropylamino)-propyl]-1-phenylcyclohexane

A solution of 13.7 g. β-(1-phenylcyclohexyl)-propionic acid chloride (B.P. 141° C./0.6 mm. Hg) in 50 ml. methylene chloride was added to a solution of 7.45 g. p-methylphenyl-isopropylamine (B.P. 93–100° C./11 mm. Hg) and 15 ml. anhydrous pyridine in 100 ml. methylene chloride. The resulting mixture was allowed to stand at room temperature for 12 hours. After washing several times with 2 N sulfuric acid and water, the reaction mixture was dried over anhydrous sodium sulfate and distilled. As residue, there were obtained 19.4 g. N-p-methylphenyl-isopropyl-β-(1-phenyl-cyclohexyl)-propionic acid amide in the form of a viscous, colorless oil. The latter oil was dissolved in 200 ml. anhydrous ether and added dropwise, with stirring, to a suspension of 2.1 g. lithium aluminum hydride in 200 ml. anhydrous ether. After boiling under reflux for 1 hour, the reaction mixture was permitted to stand for 10 hours at room temperature. The excess lithium aluminum hydride was decomposed with water, the ether phase separated from aluminum hydroxide, dried over anhydrous sodium sulfate and distilled. There were obtained 19 g. of the colorless, oily base which was dissolved in ether and mixed with the calculated amount of maleic acid. The precipiated crystals which formed were filtered off with suction (20.5 g.) and recrystallized from ethyl acetate-methylene chloride. The colorless crystals of the maleate melted at 133–134° C. The yield amount to 18.7 g.

$C_{25}H_{35}N \cdot C_4H_4O_4$ (M.W. 465.6)—Calculated, percent: C, 74.81; H, 8.44; N, 3.01. Found, percent: C, 74.59; H, 8.20; N, 3.09.

EXAMPLE 11

1-[3'-4"-chlorophenyl-isopropylamino)-propyl]-1-phenylcyclohexane

In a manner analogous to that described in Example 10, 10 g. p-chlorophenyl-isopropylamine (B.P. 111–119° C./13 mm. Hg) and 17 ml. pyridine were reacted with 14.8 g. β-(1-phenyl-cyclohexyl)-propionic acid chloride. The crude N-p-chlorophenyl-isopropyl-β-(1-phenyl-cyclohexyl)-propionic acid amide thereby obtained (23.4 g. of viscous colorless oil) was reduced with 3.5 g. lithium aluminum hydride in ether in a manner analogous to that described in Example 10 and further worked up. There were thus obtained 21.3 g. of the colorless, oily base which was dissolved in ether and mixed with the calculated amount of maleic acid. The precipitated maleate which formed was filtered off with suction (21 g.) and recrystallized from ethyl acetate. There were obtained 18.35 g. of colorless crystals having a melting point of 134–137° C.

$C_{24}H_{32}NCl \cdot C_4H_4O_4$ (M.W. 486.0).—Calculated, percent: C, 69.19; H, 7.47; N, 2.88; Cl, 7.30. Found, percent: C, 69.16; H, 7.49; N, 3.00; Cl, 7.31.

EXAMPLE 12

1-[3'-(N-n-propyl-N-4"-chlorophenyl-isopropyl)-aminopropyl]-1-phenyl-cyclohexane 6.4 g. 1 - [3'-(4"-chlorophenyl-isopropylamino)-propyl]-1-phenyl-cyclohexane prepared according to Example 11 were, together with 5 ml. pyridine, dissolved in 70 ml. anhydrous methylene chloride, mixed with 3 g. propionyl chloride in 50 ml. methylene chloride and permitted to stand at room temperature for 12 hours. The reaction mixture was subsequently washed several times with 2 N sulfuric acid and water and dried over anhydrous sodium sulfate. After distilling off the methylene chloride, there were obtained 6.75 g. of a viscous, colorless oil which was dissolved in 100 ml. anhydrous ether and added dropwise, with stirring, to a suspension of 1 g. lithium aluminum hydride in 70 ml. anhydrous ether. The reaction mixture was boiled under reflux, with stirring, for a further 2 hours. The excess lithium aluminum hydride was then decomposed with water and the ether layer separated from the aluminum hydroxide. After drying the ether phase over anhydrous sodium sulfate and distilling off the ether, there were obtained 6.2 g. 1-[3'-N-n-propyl-N-4"-chlorophenyl - isopropyl) - aminopropyl]-1-phenyl-cyclohexane in the form of a viscous, colorless oil. The oxalate, produced in the usual manner, melted after recrystallization from ethyl acetate-methylene chloride, at 141–143° C.

$C_{27}H_{38}NCl \cdot C_2H_2O_4$ (M.W. 502.1).—Calculated, percent: C, 69.37; H, 8.03; N, 2.79; Cl, 7.06. Found, percent: C, 68.92; H, 7.78; N, 3.10; Cl, 7.06.

EXAMPLE 13

1-[2'-(4"-chlorophenyl-isopropylamino)-ethyl]-1-phenylcyclohexane 5.07 g. 2-(1-phenyl-cyclohexyl)-ethylamine and 4.6 g. p-chlorophenyl-acetone were dissolved in 50 ml. benzene and permitted to stand at room temperature for 10 hours; the water which was separated off was removed and the benzene distilled off in a vacuum. The oil residue (dark yellow, 9.6 g.) was dissolved in 300 ml. 80% methanol and gradually mixed with 1.2 g. sodium borohydride. After 45 minutes, the reaction mixture was acidified with acetic acid and the methanol distilled off. The reaction mixture was then made alkaline and shaken out with methylene chloride. The methylene chloride extract yielded, upon evaporation, 9 g. of a residue which was dissolved in ether and reacted with maleic acid. The corresponding maleate thereby obtained (7 g.) was recrystallized from ethyl acetate-methylene chloride. The melting point was 156–159° C.

$C_{23}H_{30}NCl \cdot C_4H_4O_4$ (M.W. 472.0).—Calculated, percent: C, 68.70; H, 7.26; N, 2.97; Cl, 7.51. Found, percent: C, 68.50; H, 7.20; N, 2.92; Cl, 7.72.

EXAMPLE 14

1-[3'-(3",4"-dichlorophenyl-isopropylamino)-propyl]-1-phenylcyclohexane

In a manner analogous to that described in Example 10, 4.4 g. 3,4-dichlorophenyl-isopropylamine (B.P. 143–148° C./12 mm. Hg), 4 ml. anhydrous pyridine and 5.5 g. β-1-phenyl-cyclohexyl-propionic acid chloride in 200 ml. methylene chloride were reacted to give the corresponding amide which was then worked up. The impure amide (9.7 g.) was subsequently boiled under reflux for 5 hours with 1.5 g. lithium aluminum hydride in 300 ml. anhydrous ether and further processed in a manner analogous to that described in Example 10. The oily, colorless base thereby obtained, 1-[3'-(3",4"-dichlorophenyl-isopropylamino) - propyl] - 1-phenyl-cyclohexane, was dissolved in ether and converted into the maleate with the calculated amount of maleic acid. The colorless crystals which were produced were filtered off with suction (8.6 g.) and, after recrystallization from ethyl acetate-methylene chloride, melted at 156–159° C.

$C_{24}H_{31}NCl_2 \cdot C_4H_4O_4$ (M.W. 520.5).—Calculated, percent: C, 64.61; H, 6.78; N, 2.69; Cl, 13.62. Found, percent: C, 64.64; H, 6.75; N, 2.76; Cl, 13.62.

EXAMPLE 15

1-[3'-(phenyl-isopropylamino)-propyl]-1-(4"-methylphenyl)-cyclohexane

A solution of 8 g. β-[1-(4'-methyl-phenyl)-cyclohexyl]-propionic acid chloride (B.P. 150–160° C./0.6 mm. Hg) in 50 ml. methylene chloride was added to a solution of 4.05 g. phenyl-isopropylamine and 3 ml. anhydrous pyridine in 100 ml. methylene chloride and the reaction mixture permitted to stand for 12 hours at room temperature. After washing several times with 2 N sulfuric acid and water, the reaction mixture was dried over anhydrous sodium sulfate and the methylene chloride distilled off. As residue, there were obtained 10.65 g. N-phenyl-isopropyl - β-[1-(4'-methyl-phenyl)-cyclohexyl] - propionic acid amide in the form of a viscous oil, which was dissolved in 150 ml. anhydrous ether and added dropwise, with stirring, to a suspension of 2.2 g. lithium aluminum anhydride in 100 ml. anhydrous ether. After boiling under reflux for 2 hours, the reaction mixture was left to stand overnight. The excess lithium aluminum hydride was decomposed with water, the ethereal phase separated from the aluminum hydroxide, dried over anhydrous sodium sulfate and the ether distilled off. There were obtained 10.05 g. of the colorless, oily base which was then dissolved in ether and reacted with the calculated amount of maleic acid. The precipitated crystals which formed were filtered off with suction (10.33 g.) and recrystallized from ethyl acetate/methylene chloride. The colorless crystals of the maleate melted at 150–153° C. The yield amounted to 9.33 g.

$C_{25}H_{35}N \cdot C_4H_4O_4$ (M.W. 465.6).—Calculated, percent: C, 74.80; H, 8.44; N, 3.01. Found, percent: C, 74.80; H, 8.55; N, 3.10.

EXAMPLE 16

1-[3'-(N-methyl-N-phenyl-isopropyl)-aminopropyl]-1-(4''-methyl-phenyl)-cyclohexane 4 g. of the base prepared according to Example 15 were, together with 4 ml. 40% formaldehyde solution, hydrogenated in 150 ml. methanol over 100 mg. platinum oxide until the take-up of hydrogen had ended. After distilling off the methanol, the residue was taken up in ether, washed with 2 N ammonium hydroxide solution, dried over anhydrous sodium sulfate and dried in a vacuum. The compound obtained (4.14 g.) was a viscous, colorless oil. From a solution of the base in ethyl acetate-ether, there was obtained, by treatment with ethereal nitric acid, the corresponding nitrate in the form of colorless crystals having a melting point of 97–100° C. (4.25 g.)

$C_{26}H_{37}N \cdot HNO_3$ (M.W. 426.6).—Calculated, percent: C, 73.20; H, 8.98; N, 6.57. Found, percent: C, 72.96; H, 8.92; N, 6.57.

EXAMPLE 17

1-[3'-(4''-methylphenyl-isopropylamino)-propyl]-1-(4'''-methyl-phenyl)-cyclohexane 5.2 g. β - [1-(4'-methyl-phenyl)-cyclohexyl]-propionic acid chloride were added to a solution of 3.08 g. p-methyl-phenyl-isopropylamine (B.P. 98–106° C./12 mm. Hg) and 2.5 ml. anhydrous pyridine in 50 ml. methylene chloride using a procedure analogous to that described in Example 15. After completion of the reaction and appropriate working up, there were obtained 7.6 g. N-p-methylphenyl-isopropyl-β-[1-(4' - methylphenyl) - cyclohexyl]-propionic acid amide as a colorless, viscous oil which was reduced with 1.5 g. lithium aluminum hydride in ether in a manner analogous to that described in Example 15 and the reaction product further worked up. There were thusly obtained 7.0 g. of the base in the form of a colorless, viscous oil. When a solution of the base in ether was reacted with the calculated amount of maleic acid, the corresponding maleate was obtained in the form of colorless crystals which, after recrystallization from ethyl acetate-methylene chloride, melted at 170° C.

$C_{26}H_{37}N \cdot C_4H_4O_4$ (M.W. 479.6).—Calculated, percent: C, 75.12; H, 8.62; N, 2.92. Found, percent: C, 74.90; H, 8.62; N, 2.96.

EXAMPLE 18

1-[3'-(3'',4''-dimethoxyphenyl-isopropylamino)-propyl]-1-(4'''-methyl-phenyl)-cyclohexane 10 g. β - [1-(4'-methyl-phenyl)-cyclohexyl]-propionic acid chloride were added to a solution of 7.7 g. 3,4-dimethoxyphenyl-isopropylamine (B.P. 157–159° C./12 mm. Hg) and 4.5 ml. anhydrous pyridine in 50 ml. methylene chloride in a manner analogous to that described in Example 15. After completion of the reaction followed by appropriate working up, there were obtained 17.2 g. N-3'',4''-dimethoxyphenyl - isopropyl-β-[1 - (4' - methylphenyl)-cyclohexyl]-propionic acid amide in the form of a colorless, viscous oil which, after reduction with 3.14 g. lithium aluminum anhydride and working up in a manner analogous to that described in Example 15, yielded 15.8 g. of the base in the form of a colorless, viscous oil. By the addition of the calculated amount of maleic acid to a solution of the base in ether, the maleate was obtained in the form of colorless crystals (14.8 g.) which, following recrystallization from ethyl acetate-methylene chloride, melted at 137° C.

$C_{27}H_{39}NO_2 \cdot C_4H_4O_4$ (M.W. 525.66).—Calculated, percent: C, 70.82; H, 8.25; N, 2.67. Found, percent: C, 70.75; H, 8.29; N, 2.90.

EXAMPLE 19

1-[3'-(3'',4''-methylenedioxy-phenyl-isopropylamino)-propyl]-1-(4'''-methyl-phenyl)-cyclohexane A solution of 10.5 g. β-[1-(4-methyl-phenyl)-cyclohexyl]-propionic acid chloride in 50 ml. methylene chloride was added to a solution of 7.5 g. 3,4-methylenedioxy-phenyl-isopropylamine (B.P. 143–146° C./12 mm. Hg) and 5 ml. anhydrous pyridine in 50 ml. methylene chloride and reacted and worked up in a manner analogous to that described in Example 15. There were thusly obtained, 16.5 g. N-3,4-methylene-dioxy-phenyl-isopropyl-β-[1-(4'-methyl-phenyl)-cyclohexyl]-propionic acid amide in the form of a colorless, very viscous oil. Subsequent reduction of this oil with 2 g. lithium aluminum hydride in ether followed by working up in a manner analogous to that described in Example 15 yielded 15 g. of the base in the form of a colorless, viscous oil which was dissolved in ether and mixed with the calculated amount of maleic acid. The colorless crystals of the maleate which were thereby obtained melted, after recrystallization from ethyl acetate-methylene chloride, at 144–146° C.

$C_{26}H_{35}NO_2 \cdot C_4H_4O_4$ (M.W. 509.6).—Calculated, percent: C, 70.70; H, 7.71; N, 2.75. Found percent: C, 70.40; H, 7.65; N, 2.84.

EXAMPLE 20

1-[3'-(4''-chlorophenyl-isopropylamino)-propyl]-1-(4'''-methyl-phenyl)-cyclohexane 8 g. β-[1-(4'-methyl-phenyl)-cyclohexyl]-propionic acid chloride in 50 ml. methylene chloride were added to a solution of 5.07 g. p-chlorophenyl-isopropylamine (B.P. 110–120° C./12 mm. Hg) and 2 ml. anhydrous pyridine in 100 ml. methylene chloride and reacted and worked up in a manner analogous to that described in Example 15. There were thereby obtained 12.2 g. N-p-chlorophenyl-isopropyl-β-[1-(4'methyl-phenyl)-cyclohexyl] - propionic acid amide in the form of a colorless, viscous oil which, without further purification, was reduced with 2.2 g. lithium aluminum hydride in ether in a manner analogous to that described in Example 15. Further processing produced 12 g. of the colorless, oily base which, on treatment with maleic acid in ether, yielded 9.7 g. of colorless crystals of the maleate. After recrystallization from isopropanol-methylene chloride, the maleate melted at 159–161° C.

$C_{25}H_{34}NCl \cdot C_4H_4O_4$ (M.W. 500.1).—Calculated, percent: C, 69.65; H, 7.66; N, 2.80; Cl, 7.09. Found percent: C, 69.62; H, 7.78; N, 2.75; Cl, 7.09.

EXAMPLE 21

1-[3'-(3'',4''-dichlorophenyl-isopropylamino)-propyl]-1-(4'''-methyl-phenyl)-cyclohexane 8 g. β-[1-(4'-methyl-phenyl)-cyclohexyl] - propionic acid chloride in 50 ml. methylene chloride were added to a solution of 6.12 g. 3,4-dichlorophenyl-isopropylamine (B.P. 143–148° C./13 mm. Hg) and 3 ml. anhydrous pyridine in 100 ml. methylene chloride. Following reaction and working up in the manner described in Example 15, there were obtained 11.45 g. N-3″,4″-dichlorophenyl-isopropyl-β-[1-(4′-methyl-phenyl)-cyclohexyl] - propionic acid amide in the form of a glassy viscous mass which was immediately reduced with 3 g. lithium aluminum hydride in ether in a manner analogous to that described in Example 15 and the reaction product worked up. There were thusly obtained 10.4 g. of the base in the form of a colorless, very viscous oil which was converted into the maleate with maleic acid in ether. The maleate formed colorless crystals which, after recrystallization from isopropanol-methylene chloride or from ethyl acetate-methylene chloride, melted at 157–160° C.

$C_{25}H_{33}NCl_2 \cdot C_4H_4O_4$ (M.W. 534.5).—Calculated, percent: C, 65.16; H, 6.97; N, 2.62; Cl, 13.26. Found percent: C, 65.17; H, 7.03; N, 2.64; Cl, 13.07.

1-[3′-(4″-methylphenyl-isopropylamino)-propyl]-1-(4‴-methoxy-phenyl)-cyclohexane In a manner analogous to that described in Example 15, 6.4 g. p-methylphenyl-isopropylamine and 5 ml. anhydrous pyridine in 50 ml. methylene chloride were reacted with 12 g. β-[1-(4′-methoxy-phenyl)-cyclohexyl]-propionic acid chloride (B.P. 162–170° C./0.3 mm. Hg) and further worked up. There were thereby obtained 16.9 g. N-p-methylphenyl-isopropyl-β-[1-(4′-methoxy-phenyl)-cyclohexyl]-propionic acid amide in the form of a colorless, very viscous oil which oil was reduced with 3.2 g. lithium aluminum hydride in ether in a manner analogous to that described in Example 15. After working up, there were obtained 15.2 g. of the base in the form of a colorless, very viscous oil which was converted into the corresponding maleate by treatment with the calculated amount of maleic acid in ether. After recrystallization from ethyl acetate-methylene chloride, the maleate melted at 142–146° C.

$C_{26}H_{37}NO \cdot C_4H_4O_4$ (M.W. 495.6).—Calculated, percent: C, 72.70; H, 8.34; N, 2.82. Found percent: C, 72.52; H, 8.19; N, 3.01.

EXAMPLE 23

1-[2′-(3″,4″-methylenedioxy-phenyl-isopropylamino)-ethyl]-1-(4‴-methoxy-phenyl)-cyclohexane 11.15 g. 1-(4′-methoxy-phenyl)-1-(2″-amino - ethyl)-cyclohexane (B.P. 150–155° C./0.4 mm. Hg) and 8.9 g. 3,4-mthylenedioxy-phenyl-acetone were dissolved in 150 ml. benzene and allowed to stand overnight at room temperature. The water which separated was removed and the benzene distilled off. As residue there was obtained a dark yellow oil which, without further purification, was dissolved in 80% dioxan and reacted at 10° C. with 2 g. sodium borohydride. After 2 hours, the resulting reaction mixture was acidified and the dioxan distilled off in a vacuum. The residue was rendered alkaline with ammonia and shaken out with benzene. The benzene solution was dried over anhydrous sodium sulfate and filtered through a column of 150 g. neutral aluminum oxide (activity state 1). The filtrate yielded 13 g. of residue which was converted into the maleate with maleic acid in ether. After recrystallization from ethyl acetate-methylene chloride, the maleate melted at 141–143° C.

$C_{25}H_{33}NO_3 \cdot C_4H_4O_4$ (M.W. 511.6).—Calculated, percent: C, 68.08; H, 7.29; N, 2.74. Found percent: C, 67.99; H, 7.54; N, 2.88.

EXAMPLE 24

1-[3′-(3″,4″-methylenedioxy-phenyl-isopropylamino)-propyl]-1-(4‴-chlorophenyl)-cyclohexane 10 g. β-[1-(4′-chlorophenyl)-cyclohexyl] - propionic acid chloride (B.P. 162–167° C./0.4 mm. Hg) in 50 ml. methylene chloride were added to a solution of 6.6 g. 3,4-methylenedioxy-phenyl-isopropylamine and 5 ml. anhydrous pyridine in 50 ml. methylene chloride. After reaction and processing in the manner decribed in Example 15, there were obtained 15.05 g. N-3″,4″-methylenedioxy-phenyl - isopropyl-β-[1-(4′-chlorophenyl) - cyclohexyl]-propionic acid amide in the form of a colorless, viscous residue which was immediately reduced with 2.7 g. lithium aluminum hydride in ether in a manner analogous to that described in Example 15 and worked up. There were obtained 14.5 g. of the colorless, viscous, oily base which was converted into the maleate with maleic acid in ether. The maleate (13.4 g.) melted, following recrystallization from ethyl acetate-methylene chloride, at 161–163° C.

$C_{25}H_{32}NClO_2 \cdot C_4H_4O_4$ (M.W. 530.0).—Calculated, percent: C, 65.72; H, 6.85; N, 2.64; Cl, 6.69. Found percent: C, 65.82; H, 6.68; N, 2.64; Cl, 6.64.

EXAMPLE 25

1 - [3′ - (3″,4″ - dichlorophenyl - isopropylamino)-propyl] - 1 - (4‴ - chlorophenyl) - cyclohexane A solution of 10.7 g. 3,4 - dichlorophenyl-isopropylamine and 8 ml. anhydrous pyridine in 100 ml. methylene chloride was mixed with 10 g. β - [1 - (4′ - chlorophenyl)-cyclohexyl] - propionic acid chloride in 150 ml. methylene chloride and reacted and worked up in the manner described in Example 15. There were obtained 23 g. of colorless N - 3″,4″ - dichlorophenyl - isopropyl-β - [1 - 4′ - chlorophenyl) - cyclohexyl] - propionic acid amide which, following recrystallization from diisopropyl ether, melted at 122–126° C. The reduction of the unpurified amide with 3.7 g. lithium aluminum hydride in ether followed by working up in the manner described in Example 15 yielded 20.70 g. of the viscous, colorless base from which the maleate (19.75 g.) was produced with maleic acid in ether. After recrystallization from ethyl acetate, the maleate melted at 152–157° C.

$C_{24}H_{30}NCl_3 \cdot C_4H_4O_4$ (M.W. 554.9).—Calculated percent: C, 60.60; H, 6.18; N, 2.52; Cl, 19.17. Found, percent: C, 60.72; H, 6.09; N, 2.54; Cl, 19.00.

EXAMPLE 26

1 - [3′ - (3″,4″,5″ - trimethoxyphenyl - isopropylamino)-propyl] - 1 - (4‴ - chlorophenyl) - cyclohexane 5.3 g. of the hydrochloride of 3,4,5 - trimethoxy - phenyl - isopropylamine (M.P. 200–201° C.) were converted into the base (4.2 g.) by treatment with an aqueous solution of sodium hydroxide and, together with 3 ml. pyridine in 100 ml. methylene chloride, mixed with 5.3 g. β - [1 - (4′ - chlorophenyl) - cyclohexyl] - propionic acid chloride. The resulting mixture was reacted and worked up in the manner described in Example 15. There were obtained 8.3 g. N - 3″,4″,5″ - trimethoxyphenyl-isopropyl - β - [1 - (4′ - chlorophenyl) - cyclohexyl]-propionic acid amide which, without further purification, was reduced with 1.33 g. lithium aluminum hydride in ether. Working up in a manner analogous to that of Example 15 yielded 7.95 g. of the colorless, oily base. The corresponding maleate was obtained by treatment of the base with maleic acid in ether and, after recrystallization from ethyl acetate-methylene chloride, melted at 149–151° C.

$C_{27}H_{38}O_3NCl \cdot C_4H_4O_4$ (M.W. 576.12).—Calculated, percent: C, 64.63; H, 7.35; N, 2.44. Found, percent: C, 64.42; H, 7.27; N, 2.41.

EXAMPLE 27

1-[3′-(4″-benzyloxyphenyl-isopropylamino)-propyl]-1-(4‴-chlorophenyl)-cyclohexane 14.2 g. β - [1 - (4′ - chlorophenyl) - cyclohexyl] - propionic acid chloride in 150 ml. anhydrous methylene chloride were added to a solution of 12 g. p - benzyloxyphenyl - isopropylamine (B.P. 160–164° C./0.4 mm. Hg) and 8 ml. pyridine in 100 ml. anhydrous methylene chloride. After reaction and working up as in Example 15, there were obtained 23.7 g. N - p - benzyloxyphenyl-isopropyl - β - [1 - p - chlorophenyl) - cyclohexyl] - propionic acid amide as a colorless residue which residue was immediately reduced with 4.6 g. lithium aluminum hydride in 300 ml. absolute ether in a manner analogous to that of Example 15 and thereafter further processed. There were thusly obtained 23.1 g. of the colorless base which was converted into the maleate with a solution of maleic acid in ether. The maleate (21.1 g.) melted, after recrystallization from ethyl acetate or isopropanol, at 158–160° C.

$C_{31}H_{38}NOCl \cdot C_4H_4O_4$ (M.W. 592.2).—Calculated, percent: C, 70.99; H, 7.15; N, 2.36; Cl, 5.99. Found, percent: C, 71.04; H, 7.32; N, 2.28; Cl, 6.14.

EXAMPLE 28

1 - [3' - (4'' - hydroxyphenyl - isopropylamino) - propyl]- 1 - (4''' - chlorophenyl) - cyclohexane 7 g. of the maleate of the 1 - [3' - (4'' - benzyloxyphenyl - isopropylamino) - propyl] - 1 - (4''' - chlorophenyl) - cyclohexane prepared according to Example 27 were dissolved in 70 ml. glacial acetic acid and, after the addition of 15 ml. 48% hydrobromic acid, heated under reflux for 20 minutes. The reaction mixture was thereafter highly concentrated in a vacuum rendered alkaline with a sodium bicarbonate solution and shaken out with methylene chloride. The methylene chloride phase was washed with water, dried over anhydrous sodium sulfate and the solvent distilled off. The residue (4.3 g.) was recrystallized from methanol/methylene chloride. The crystals obtained (3.99 g.) melted at 184–186° C.

$C_{24}H_{32}NOCl$ (M.W. 385.97).—Calculated, percent: C, 74.67; H, 8.36; N, 3.63; Cl, 9.19. Found, percent: C, 74.40; H, 8.32; N, 3.44; Cl, 9.07.

EXAMPLE 29

1 - [3' - (phenyl - isopropylamino) - propyl] - 1 - (4''-chlorophenyl) - cyclohexane A solution of 4.95 g. phenyl - isopropylamine and 9 ml. pyridine in 70 ml. anhydrous methylene chloride was mixed with 10.45 g. $\beta$ - [1 - (4' - chlorophenyl) - cyclohexyl] - propionic acid chloride in 70 ml. anhydrous methylene chloride and reacted and worked up as disclosed in Example 15. There were obtained 14.0 g. colorless N - phenyl - isopropyl - $\beta$ - [1 - (4' - chlorophenyl)-cyclohexyl] - propionic acid amide which was immediately reduced with 2.8 g. lithium aluminum hydride in 250 ml. anhydrous ether in a manner analogous to that of Example 15 and the reduction product further worked up. There were thereby obtained 13.2 g. of the colorless, oily base which was converted into the maleate with a solution of maleic acid in ether. The maleate (13.2 g.) melted, after recrystallization from ethyl acetate-methylene chloride, at 150–153° C.

$C_{24}H_{32}NCl \cdot C_4H_4O_4$ (M.W. 486.0).—Calculated, percent: C, 69.19; H, 7.47; N, 2.88; Cl, 7.30. Found, percent: C, 69.13; H, 7.51; N, 2.85; Cl, 7.33.

EXAMPLE 30

1-[2'-(N-methyl-N-phenylisopropyl)-aminoethyl]- 1-(3'',4''-dimethoxy-phenyl)-cyclohexane 5.15 g. N-methyl - 2 - [1' - (3'',4'' - dimethoxyphenyl)-cyclohexyl]-ethylamine (a colorless oil having a boiling point of 142–148° C./0.1 mm. Hg) were heated for 10 hours at 130° C. with 7.7 g. 1-phenyl-2-chloropropane. The reaction mixture was thereafter mixed with methylene chloride, consecutively shaken out with dilute ammonia solution and water and dried over anhydrous sodium sulfate. The oily residue (10.49 g.) which was obtained after distilling off the methylene chloride was chromatographed through 100 g. basic aluminum oxide, using benzene as solvent. The fractions which were eluted with benzene were dissolved in ether and treated with oxalic acid. After recrystallization from isopropanol-ethyl acetate, the oxalate melted at 141–142° C.

$C_{26}H_{37}NO_2 \cdot C_2H_2O_4$ (M.W. 485.6).—Calculated, percent: C, 69.26; H, 8.10; N, 2.88. Found, percent: C, 69.35; H, 8.22; N, 3.13.

EXAMPLE 31

1-[3'-(N-ethyl-N-3'',4''-methylenedioxyphenyl-isopropylamino)-propyl]-1-phenyl-cyclohexane 9.4 g. N-acetyl - 1 - [3' - (3'',4''-methylenedioxyphenyl-isopropylamino)-propyl]-1-phenyl-cyclohexane (produced by acetylation of the base obtained according to procedure disclosed in Example 4 with acetic anhydride and pyridine) was dissolved in 100 ml. absolute ether and added dropwise, with stirring, to a suspension of 0.85 g. lithium aluminum hydride in 100 ml. ether. The resulting mixture was heated for an hour under reflux. After 10 hours of standing at room temperature, the lithium aluminum hydride was decomposed with water and the ether separated, dried over sodium sulfate, and evaporated to dryness. The residue thus obtained amounted to 8.5 g. of a viscous, colorless oil. The residue was dissolved in isopropanol and acidified with anhydrous nitric acid and the nitrate of 1-[3'-(N-ethyl - N - 3'',4''-methylenedioxyphenyl-isopropylamino)-propyl] - 1 - phenyl-cyclohexane obtained by crystallization. On recrystallization from acetic ester, colorless crystals having a melting point of 102–105° C. were obtained.

$C_{27}H_{37}NO_2 \cdot HNO_3$ (470.6).—Calculated, percent: C, 68.91; H, 8.13; N, 5.95. Found, percent: C, 68.95; H, 8.17; N, 6.06.

EXAMPLE 32

1-[3'-(N-ethyl-N-4''-benzyloxyphenyl-isopropyl)-aminopropyl]-1-phenyl-cyclohexane 10.8 g. 1-[3' - (4'' - benzyloxyphenyl-isopropylamino)-propyl]-1-phenyl-cyclohexane (see Example 6) were dissolved in 150 ml. methylene chloride and the solution reacted with 9.8 ml. of pyridine and 11.6 ml. of acetic anhydride. The reaction mixture was allowed to stand overnight at room temperature and was then washed several times with 2 N hydrochloric acid and 2 N soda solution. After drying the methylene chloride solution over sodium sulfate and distilling off the methylene chloride, 11.8 g. of the N-acetyl compound was recovered. The recovered N-acetyl compound was dissolved in 200 ml. ether and added dropwise, with stirring, to a suspension of 1.9 g. lithium aluminum hydride in 100 ml. ether. The reduction was completed in two hours, excess lithium aluminum hydride was decomposed with water, and the ether layer separated out. 10.8 g. of ether residue were thereby obtained, which were dissolved in ether and chromatographed on 150 g. of basic aluminum oxide. 9.6 g. of a viscous oil were eluted with ether, which on standing formed crystals. On recrystallization from methanol, 9.2 g. of colorless crystals were obtained, which melted at 51–52.5° C.

$C_{33}H_{43}NO$ (469.7).—Calculated: C, 84.39; H, 9.23; N, 2.98%. Found: C, 84.31; H, 9.22; N, 3.10%. Equivalent weight: 471.

EXAMPLE 33

1-[3'-(3''-methoxy-4''-benzyloxyphenyl-isopropylamino)-propyl]-1-phenyl-cyclohexane 17.5 g. N-(3''-methoxy-4''-benzyloxyphenyl-isopropyl)-$\beta$-(1-phenyl-cyclohexyl)-propionic acid amide [prepared from 3-methoxy - 4 - benzyloxyphenyl - isopropylamine (B.P.$_{0.2}$ 177–180° C.) and $\beta$-(1-phenylcyclohexyl)-propionic acid chloride] were dissolved in 250 ml. of ether and the solution added dropwise, with stirring, to a suspension of 2.75 g. lithium aluminum hydride in 100 ml. ether. The resulting mixture was heated for two hours under reflux. After decomposing excess lithium aluminum hydride with water and drying the separated ether layer, 17 g. of ether residue were obtained. The ether residue was dissolved in ether and converted to the corresponding maleinate salt by reaction with the calculated amount of maleic acid. The maleinate was recrystallized from acetic ester (13.2 g.) and melted at 138–141° C.

$C_{32}H_{41}NO_2 \cdot C_4H_4O_4$ (587.7).—Calculated: C, 73.57; H, 7.72; N, 2.38%. Found: C, 73.20; H, 7.79; N, 2.48%.

EXAMPLE 34

(+)-1-[3'-(3″,4″-methylenedioxyphenyl-isopropyl-amino)-propyl]-1-phenyl-cyclohexane 8 g. (+) - 3,4 - methylenedioxyphenyl-isopropylamine (tartrate: $\alpha_D^{30} = +26.8°$ in water) were dissolved in 200 ml. methylene chloride and converted into the amide with 11.3 g. β-(1-phenyl-cyclohexyl)-propionic acid chloride and 20 ml. pyridine. The 15.5 g. of unpurified (+) - N - (3',4' - methylenedioxyphenyl-isopropyl)-β-(1-phenylcyclohexyl)-propionic acid amide thereby obtained were dissolved in 200 ml. ether and this solution added dropwise, with stirring, to a suspension of 3 g. lithium aluminum hydride in 70 ml. ether and heated for 3 hours under reflux. After decomposing the excess lithium aluminum hydride with water and separating the ether layer, 13.85 g. of an ether residue was obtained as a colorless oil from which the maleinate could be prepared with maleic acid in ether. The maleinate, following recrystallization from acetic ester-methylene chloride (10.7 g.), melted at 155–157° C.

$[\alpha]_D^{25} = +15.2 \pm 0.5°$ (in CHCl₃; c.~1%).

$C_{25}H_{33}NO_2 \cdot C_4H_4O_4$ (495.6).—Calculated: C, 70.28; H, 7.52; N, 2.82%. Found: C, 69.83; H, 7.70; N, 2.84%.

EXAMPLE 35

(+)-1-[3'-(phenylisopropylamino)-propyl]-1-phenyl-cyclohexane 15 g. of (+)-phenylisopropylamine, in 250 ml. methylene chloride were converted into the amide using 27.8 g. β-(1-phenyl-cyclohexyl)-propionic acid chloride and 27 ml. pyridine. The (+)-N-(phenylisopropyl)-β-(1-phenyl-cyclohexyl)-propionic acid amide thereby obtained (33.9 g. of viscous oil) was dissolved in 400 ml. ether and added dropwise, with stirring, to a suspension of 7.4 g. lithium aluminum hydride in 150 ml. ether. The resulting mixture was heated for six hours under reflux. After decomposing the excess lithium aluminum hydride with water and separating the ether layer, an ether residue of 29.3 g. of colorless oil was obtained, which was converted into the corresponding salt with maleic acid. The maleinate (35.3 g.) melted at 158–159° C. after recrystallization from acetic ester.

$[\alpha]_D^{25} = +11.9 \pm 0.5°$ (in CHCl₃; c.~1%).

$C_{24}H_{33}N \cdot C_4H_4O_4$ (451.6).—Calculated: C, 74.46; H, 8.26; N, 3.10%. Found: C, 74.24; H, 8.17; N, 3.12%.

This compound could also be obtained by racemic separation of the d,l-1-[3'-(phenylisopropylamino)-propyl]-1-phenyl-cyclohexane obtained according to the method of Example 1:

8.13 g. of d,l-1-[3'-(phenylisopropylamino)-propyl]-1-phenyl-cyclohexane were dissolved in 80 ml. acetone, reacted under application of heat with 3.15 g. d-camphorsulphonic acid in 25 ml. acetone and allowed to stand in the cold for 10 hours to crystallize. The 6.58 g. of crystals which were thereby obtained melted at 178° C. and consisted chiefly of the d-camphorsulfonic acid salt of the levorotatory 1-[3'-(phenylisopropylamino)-propyl]-1-phenyl-cyclohexane. 3.4 g. d-camphorsulfonic acid in 20 ml. acetone were added to the mother liquor after first concentrating the same to 50 ml. The crystals were filtered off after 10 hours of standing (5.99 g.), melted at 147° C. and consisted chiefly of the d-camphorsulfonate of the dextrorotatory 1-[3'-(phenylisopropylamino)-propyl]-1-phenyl-cyclohexane. On further recrystallizing the first crop of crystals from acetone, the pure d-camphorsulfonic acid salt of (−)-1-[3'-(phenylisopropylamino)-propyl]-1-phenyl-cyclohexane was obtained as colorless crystals having a melting point of 187–188° C.

$[\alpha]_D^{20} = +11.8 \pm 0.5°$ (c.~1%, in methanol).

$C_{24}H_{33}N \cdot C_{10}H_{16}SO_4$ (567.8).—Calculated: C, 71.92; H, 8.70; N, 2.47; S, 5.64%. Found: C, 71.88; H, 8.76; N, 2.45; S, 6.20%.

The maleinate of (−)-1-[3'-(phenylisopropylamino)-propyl]-1-phenyl-cyclohexane formed colorless crystals from acetic ester, which melted at 158° C.

$[\alpha]_D^{20} = -11.3 \pm 0.5°$ (c.~1%, in CHCl₃).

$C_{24}H_{33}N \cdot C_4H_4O_4$ (451.6).—Calculated: C, 74.46; H, 8.26; N, 3.10%. Found: C, 74.19; H, 8.29; N, 3.14%.

After further recrystallizing the second crop of crystals from acetone, the d-camphorsulfonic acid salt of (+)-1-[3'-(phenylisopropylamino)-propyl] - 1 - phenylcyclohexane was obtained as colorless crystals having a melting point of 151–152° C.

$[\alpha]_D^{20} = +21.7 \pm 0.5°$ (c.~1%, in CHCl₃).

$C_{24}H_{33}N \cdot C_{10}H_{16}O_4$ (567.8).—Calculated: C, 71.92; H, 8.70; N, 2.47; S, 5.64%. Found: C, 71.77; H, 8.73; N, 2.41; S, 5.80%.

The maleinate prepared from the d-camphorsulfonic acid salt of the (+)-compound melted at 158–159° C. after recrystallization from acetic ester, and was identical with the product described above.

EXAMPLE 36

1-[3'-(3″,4″-methylenedioxy-phenyl-isopropylamino)-propyl]-1-phenyl-cyclohexane 2.16 g. β-(1-phenyl-cyclohexyl)-propionaldehyde (colorless oil; B.P. 128–135° C./0.5 mm. Hg) and 1.79 g. 1 - (3',4' -methylenedioxy - phenyl) - isopropylamine were dissolved in 30 ml. methanol and, after standing for 30 minutes at room temperature, mixed with 0.37 g. sodium borohydride. The reaction mixture was left to stand for 30 minutes and subsequently mixed with 50 ml. water. After distilling off the methanol, the residue was extracted twice with 25 ml. amounts of ether. After drying over anhydrous sodium sulphate and distilling off the ether, there were obtained 4 g. of oily base as residue which, dissolved in ether, was converted into the corresponding salt with maleic acid. There were obtained 4.8 g. of the maleate of 1-[3'-(3″,4″-methylenedioxy-phenyl - isopropylamino) - propyl] - 1 - phenyl - cyclohexane which, after recrystallization from ethyl acetate/methylene chloride, melts at 148–150° C.

EXAMPLE 37

1-[2'-(N-ethyl-N-3″,4″-methylenedioxy-phenyl-isopropyl-amino)-ethyl]-1-phenyl-cyclohexane 2.22 g. α-(1-phenyl-cyclohexyl) - acetaldehyde and 2.07 g. N - ethyl - 3,4 - methylenedioxy-phenyl-isopropylamine (B.P. 140–145° C./12mm. Hg) were dissolved in 50 ml. methanol and, after standing for 30 minutes, hydrogenated over 100 mg. platinum oxide. Following completion of the take-up of hydrogen and fitering off of the catalyst, the bulk of the methanol was distilled off. The residue was then mixed with 50 ml. of water and extracted several times with 20 ml. amounts of ether. After washing with a solution of sodium carbonate and water and drying over anhydrous sodium sulfate, the combined ether phases were distilled and yielded 3.85 g. of an oily residue. After recrystallization from methanol, 1-[2'-(N-ethyl - N - 3″,4″ - methylenedioxy - phenyl - isopropylamino)-ethyl]-1-phenyl-cyclohexane was obtained in the form of colorless crystals melting at 67–68.5° C.

$C_{26}H_{35}NO_2$ (M.W. 393.6).—Calculated: C, 79.35%; H, 8.96%; N, 3.56%. Found: C, 79.00%; H, 9.09%; N, 3.67%.

EXAMPLE 38

N-[3-(1'-phenyl-cyclohexyl)-propyl]-homoveratrylamine 21.4 g. N - [β - (1 - phenyl - cyclohexyl) - propionyl]-homoveratrylamine (colorless, viscous oil) were dissolved in 200 ml. anhydrous ether, added dropwise, with stirring, to a suspension of 3.3 g. lithium aluminum hydride in 100 ml. ether and heated under reflux for 2 hours. After decomposition of excess lithium aluminum hydride with water, the reaction mixture was filtered and the filtrate evaporated to give 20.6 g. of a colorless oil which was then converted into the oxalate with oxalic acid in ether. After recrystallization from methanol, the oxalate of N-[3-(1'-phenyl - cyclohexyl) - propyl] - homoveratrylamine so obtained melted at 205–206° C.

$C_{25}H_{35}NO_2 \cdot C_2H_2O_4$ (M.W. 471.6)—Calculated, percent: C, 68.76; H, 7.91; N, 2.97. Found, percent: C, 68.69; H, 7.84; N, 3.06.

The maleate, obtained in an analogous manner, melted, after recrystallization from ethyl acetate, at 109–111° C. and the nitrate, also obtained in an analogous manner, melted, after recrystallization from ethyl acetate, at 123–125° C.

EXAMPLE 39

N-methyl-N-[3-(1'-phenyl-cyclohexyl)-propyl]-homoveratrylamine 4 g. N - [3 - (1' - phenyl - cyclohexyl) - propyl]-homoveratrylamine were dissolved in 100 ml. methanol and, after the addition of 3 ml. of a 30% formaldehyde solution, hydrogenated over 150 mg. platinum oxide until the end of the take-up of hydrogen. The methanol was then distilled off, the residue taken up in methylene chloride and successively washed with ammonia solution and water, dried over anhydrous sodium sulfate and the methylene chloride distilled off. The residue (4.2 g.) was dissolved in ether and converted into its corresponding oxalate with oxalic acid. After recrystallization, the oxalate of N-methyl-N-[3-(1'-phenyl-cyclohexyl)-propyl]-homoveratrylamine so obtained melted at 159.5–161.5° C.

$C_{26}H_{37}NO_2 \cdot C_2H_2O_4$ (M.W. 485.6)—Calculated, percent: C, 69.25; H, 8.10; N, 2.88. Found, percent: C, 69.14; H, 8.32; N, 2.95.

EXAMPLE 40

N-[3-(1'-phenyl-cyclohexyl)-propyl]-phenoxyethylamine 17.6 g. N - [β - (1 - phenyl - cyclohexyl) - propionyl]-phenoxyethylamine (colorless oil, prepared from phenoxyethylamine and β-(1-phenyl-cyclohexyl)-propionic acid chloride) were dissolved in 250 ml. anhydrous ether, added dropwise to a suspension of 3.2 g. lithium aluminum hydride in 100 ml. anhydrous ether, boiled under reflux for 5 hours and then further worked up as described in Example 38. There were thus obtained 15.5 g. of a colorless, oily base which was converted into its corresponding salt with maleic acid in ether. The 16.5 g. of the maleate of N - [3 - (1' - phenyl - cyclohexyl) - propyl] - phenoxyethylamine so obtained melted, after recrystallization from ethyl acetate, at 147–149° C.

$C_{23}H_{31}NO \cdot C_4H_4O_4$ (M.W. 453.6)—Calculated, percent: C, 71.50; H, 7.78; N, 3.09. Found, percent: C, 71.50; H, 7.98; N, 3.06.

EXAMPLE 41

N-[3'-(1''-phenyl-cyclohexyl)-propyl]-1-phenyl-aminoethanol 7.9 g. N-[β-(1-phenyl-cyclohexyl)-propionyl]-ω-aminoacetophenone (colorless crystals from diisopropyl ether; M.P. 109–110° C.) were dissolved in 100 ml. absolute ether, added dropwise, with stirring, to a suspension of 1.8 g. lithium aluminum hydride in 70 ml. anhydrous ether and heated under reflux for 2 hours. After decomposition of the excess lithium aluminum hydride and working up in the usual manner, there were obtained 7.1 g. of a crystalline, colorless residue which, following recrystallization from diisopropyl ether, yielded colorless crystals of N - [3' - (1'' - phenyl - cyclohexyl) - propyl] - 1-phenyl-aminoethanol having a melting point of 115–116° C.

$C_{23}H_{31}NO$ (M.W. 337.5)—Calculated, percent: C, 81.85; H, 9.26; N, 4.15. Found, percent: C, 82.23; H, 9.21; N, 4.12.

EXAMPLE 42

N-[3'-(1''-phenyl-cyclohexyl)-propyl]-1-(3''',4'''-dichlorophenyl)-aminoethanol

In a manner analogous to that described in Example 41, 14.2 g. N-[β-(1'-phenyl-cyclohexyl)-propionyl]-ω-amino-3,4-dichloroacetophenone (almost colorless crystals having a melting point of 112–115° C., following recrystallization from diisopropyl ether) were reduced with 3.5 g. lithium aluminum hydride in ether and then worked up. The 14.1 g. of residue thereby obtained from the ethereal solution were converted into the hydrochloride which was then recrystallized from ethyl acetate. The colorless crystals of the hydrochloride of N-[3'-(1''-phenyl - cyclohexyl) - propyl] - 1 - (3''',4''' - dichlorophenyl)-aminoethanol so obtained melted at 180–182° C.

$C_{23}H_{29}Cl_2NO \cdot HCl$ (M.W. 442.9)—Calculated, percent: C, 62.37; H, 6.83; N, 3.16; Cl, 24.01. Found, percent: C, 62.77; H, 6.89; N, 3.16; Cl, 24.03.

EXAMPLE 43

N-methyl-N-[3'-(1''-phenyl-cyclohexyl)-propyl]-1-(3''', 4'''-dichlorophenyl)-aminoethanol In a manner analogous to that described in Example 39, 8.5 g. N-[3'-(1''-phenyl-cyclohexyl)-propyl]-1-(3''',4'''-dichlorophenyl)-aminoethanol were hydrogenated with 10 ml. of 30% formaldehyde solution in 200 ml. methanol over 100 mg. platinum oxide until the end of the take-up of hydrogen. The 8.6 g. crude residue thus obtained were converted into the salt with oxalic acid. After recrystallization from ethyl acetate, the oxalate of N-methyl-N-[3',(1''-phenylcyclohexyl)-propyl]-1-(3''',4''' - dichlorophenyl)-aminoethanol thereby obtained melted at 144–146° C.

$C_{24}H_{31}Cl_2NO \cdot C_2H_2O_4$ (M.W. 510.4)—Calculated, percent: C, 61.18; H, 6.51; N, 2.74; Cl, 13.89. Found, percent: C, 61.44; H, 6.52; N, 2.84; Cl, 13.51.

EXAMPLE 44

N-[3'-(1''-phenyl-cyclohexyl)-propyl]-1-amino-2-hydroxy-3-(m-methylphenoxy)-propane 18.2 g. N-[β-(phenyl-cyclohexyl)-propionyl]-1-amino-2-hydroxy-3-(m-methyl - phenoxy) - propane [colorless, viscous oil, prepared from 1-amino-2-hydroxy-3-(m-methyl-phenoxy)-propane and β - (1-phenyl-cyclohexyl)-propionic acid chloride] were reduced with 3 g. lithium aluminum hydride in 400 ml. ether in a manner analogous to that described in Example 38 and worked up. The 16.2 g. of crude residue obtained were converted into the salt with oxalic acid and, after recrystallization from ethyl acetate/methylene chloride, there was obtained the oxalate of N - [3' - (1'' - phenyl-cyclohexyl)-propyl]-1-amino-2-hydroxy-3-(m-methylphenoxy) - propane in the form of colorless crystals which melted at 140–143° C.

$C_{25}H_{35}O_2N \cdot C_2H_2O_4$ (M.W. 471.6)—Calculated, percent: C, 68.76; H, 7.91; N, 2.97. Found, percent: C, 68.93; H, 7.98; N, 3.07.

EXAMPLE 45

N-[3-(1'-phenyl-cyclohexyl)-propyl]-D-norephedrin 17.1 g. crude N-[β-(1-phenyl-cyclohexyl)-propionyl]-D-norephedrin (viscous, colorless oil) were reduced with 6.1 g. lithium aluminum hydride in ether in a manner analogous to that described in Example 38 and then further worked up. The 15.65 g. crude residue yielded the salt with maleic acid which, after recrystallization, gave colorless crystals of the maleate of N-[3-(1'-phenyl-cyclohexyl)-propyl] - D - norephedrin having a melting point of 165–167° C.

$C_{24}H_{33}NO \cdot C_4H_4O_4$ (M.W. 467.6)—Calculated, percent: C, 71.99; H, 7.98; N, 2.99. Found, percent: C, 71.42; H, 7.97; N, 3.07.

Molecular weight by titration: 465.

$[\alpha]_D^{25} = -18.6 \pm 0.5°$ (c.~1% in chloroform).

EXAMPLE 46

N-[3-(1'-phenyl-cyclohexyl)-propyl]-d-pseudoephedrin 16.5 g. crude N-[β-(1-phenyl-cyclohexyl)-propionyl]-d-pseudoephedrin were reduced with 5.4 g. lithium aluminum hydride in 250 ml. ether in a manner analogous to that described in Example 38 and further worked up.

The 15.6 g. of crude residue thus obtained were converted into the nitrate which, after recrystallization from ethyl acetate, yielded colorless crystals of the nitrate of N-[3-(1'-phenyl-cyclohexyl) - propyl]-d-pseudoephedrin having a melting point of 122–124° C.

$C_{25}H_{35}NO \cdot HNO_3$ (M.W. 428.6)—Calculated, percent: C, 70.06; H, 8.47; N, 6.54. Found, percent: C, 69.97; H, 8.47; N, 6.60.

Molecular weight by titration: 427.

$[\alpha]_D^{25} = +36.5 \pm 0.5°$ (c.~1% in chloroform).

EXAMPLE 47

N-[3-(1'-phenyl-cyclohexyl)-propyl]-ephedrin 13.6 g. crude N-[β-(1-phenyl-cyclohexyl)-propionyl]-ephedrin (viscous, colorless oil) were reduced with 4.4 g. lithium aluminum hydride in 300 ml. ether in a manner analogous to that described in Example 38 and worked up. The 12.3 g. of crude product thereby obtained were converted into the nitrate which, after recrystallization from ethyl acetate, gave colorless crystals of the nitrate of N-[3-(1'-phenyl-cyclohexyl)-propyl]-ephedrin which melted at 132.5–134° C.

$C_{25}H_{35}NO \cdot HNO_3$ (M.W. 428.6)—Calculated, percent: C, 70.06; H, 8.47; N, 6.54. Found, percent: C, 69.74; H, 8.60; N, 6.64.

Molecular weight by titration: 425.

$[\alpha]_D^{25} = -11.3 \pm 0.5°$ (c.~1% in chloroform).

EXAMPLE 48

N-[2'-(1''-phenyl-cyclohexyl)-ethyl]-β-phenyl-ethylamine 10 g. 2-(1'-phenyl - cyclohexyl) - ethylamine and 9 g. phenyl-acetaldehyde were dissolved in 250 ml. methanol and, after one hour, mixed with 1.45 g. sodium borohydride. After a further hour, the reaction mixture was mixed with 100 ml. water, the methanol distilled off in a vacuum and the residue extracted with ether. The ethereal solution, after drying over anhydrous sodium sulfate, was acidified with maleic acid and the precipitated maleate which formed filtered off with suction. There were obtained about 14 g. of the maleate of N-[2'-(1''-phenyl-cyclohexyl)-ethyl]-β - phenyl - ethylamine in the form of colorless crystals which, after recrystallization from ethyl acetate/methylene chloride, melted at 134–136° C.

$C_{22}H_{29}N \cdot C_4H_4O_4$ (M.W. 423.5)—Calculated, percent: C, 73.73; H, 7.85; N, 3.30. Found, percent: C, 73.45; H, 8.01; N, 3.42.

EXAMPLE 49

N-ethyl-N-[2-(1'-phenyl-cyclohexyl)-ethyl]-β-phenyl-ethylamine 17.2 g. N-ethyl-N - [2-(1'-phenyl-cyclohexyl)-ethyl]-phenyl-acetamide [colorless, viscous oil, prepared from phenyl-acetic acid chloride and N-ethyl - 1 - (1'-phenyl-cyclohexyl)-ethylamine] were dissolved in 150 ml. ether and added dropwise to a suspension of 2.83 g. lithium aluminum hydride in ether. After heating the reaction mixture under reflux for 3 hours, it was worked up in the usual manner. There were obtained 15.6 g. of the crude base in the form of a colorless oil which was then dissolved in ether and reacted with oxalic acid. There was thusly obtained the oxalate of N-ethyl-N-[2-(1'-phenyl-cyclohexyl)-ethyl]-β-phenyl-ethylamine which, after recrystallization from ethyl acetate, formed colorless crystals which melted at 139–140° C.

$C_{24}H_{33}N \cdot C_2H_2O_4$ (M.W. 425.6)—Calculated, percent: C, 73.38; H, 8.29; N, 3.29. Found, percent: C, 73.29; H, 8.56; N, 3.29.

EXAMPLE 50

N-[3-(1'-phenyl-cyclohexyl)-propyl]-β-phenyl-ethylamine 42 g. N-[β-(1 - phenyl - cyclohexyl) - propionyl] - β-phenyl-ethylamine (colorless crystals having a melting point of 95.5–97° C. following recrystallization from diisopropyl ether) were dissolved in a mixture of 100 ml. anhydrous tetrahydrofuran and 300 ml. anhydrous ether and added dropwise to a suspension of 7 g. lithium aluminum hydride in 200 ml. anhydrous ether. After working up in a manner analogous to that described in Example 38, the crude base was converted into the maleate. The yield amounted to 48 g. The colorless crystals thereby obtained of the maleate of N-[3-(1'-phenyl-cyclohexyl)-propyl]-β-phenyl-ethylamine melted, after recrystallization from ethyl acetate/methylene chloride, at 135–137° C.

$C_{23}H_{31}N \cdot C_4H_4O_4$ (M.W. 437.6).—Calculated, percent: C, 74.11; H, 8.06; N, 3.20. Found, percent: C, 74.15; H, 8.21; N, 3.22.

EXAMPLE 51

N-ethyl-N-[3-(1'-phenyl-cyclohexyl)-propyl]-β-phenyl-ethylamine 14.55 g. N-[3-(1'-phenyl-cyclohexyl)-propyl]-β-phenyl-ethylamine (prepared by treating the maleate obtained according to Example 50 with a base) were dissolved in 100 ml. methylene chloride and mixed with 10 ml. acetic anhydride and 10 ml. pyridine. The reaction mixture was left to stand overnight and yielded, after the conventional working up, 16 g. of the corresponding N-acetyl compound as a viscous, colorless oil which, without further purification, was dissolved in 200 ml. anhydrous ether and added dropwise to a suspension of 2.4 g. lithium aluminum hydride in 100 ml. anhydrous ether. After heating under reflux for 3 hours, the reaction mixture was worked up. There were obtained 14.25 g. of residue which was converted into the oxalate in the usual manner. After recrystallization of the salt from ethyl acetate, the oxalate of N-ethyl-N-[3-(1'-phenyl-cyclohexyl)-propyl]-β-phenyl-ethylamine which was obtained in the form of colorless crystals melted at 123–125° C.; yield 16.6 g.

$C_{25}H_{35}N \cdot C_2H_2O_4$ (M.W. 439.6).—Calculated, percent: C, 73.77; H, 8.49; N, 3.18. Found, percent: C, 73.50; H, 8.52; N, 3.25.

EXAMPLE 52

N-[3'-(1''-phenyl-cyclohexyl)-propyl]-β-(3,4-dichlorophenyl)-ethylamine 28.7 g. N-[β-(1-phenyl-cyclohexyl)-propionyl]-β-(3,4-dichlorophenyl)-ethylamine (colorless oil) were reduced with 4.2 g. lithium aluminum hydride in a manner analogous to that described in Example 38 and worked up. As ether residue, there were obtained 25.7 g. of a colorless oil which was converted into the maleate with maleic acid in ether. There were obtained 22.6 g. of the maleate of N - [3' - (1'' - phenyl - cyclohexyl) - propyl] - β - (3,4-dichlorophenyl)-ethylamine which, after recrystallization from ethyl acetate/methylene chloride, melted at 164–165° C.

$C_{23}H_{29}Cl_2N \cdot C_4H_4O_4$ (M.W. 506.5).—Calculated, percent: C, 64.02; H, 6.57; N, 2.76; Cl, 14.00. Found, percent: C, 63.79; H, 6.61; N, 2.79; Cl, 14.02.

EXAMPLE 53

N-ethyl-N-[3'-(1''-phenyl-cyclohexyl)-propyl]-β-(3,4-dichlorophenyl)-ethylamine

In a manner analogous to that described in Example 51, the base prepared from 11.7 g. of the maleate of N - [3' - (1' - phenyl - cyclohexyl) - propyl] - β - (3,4-dichlorophenyl)-ethylamine was acetylated and then reduced with lithium aluminum hydride. There were thus obtained 9.76 g. of a base which was dissolved in ether and then converted into the oxalate. After recrystallization from ethyl acetate/methylene chloride, there was obtained the oxalate of N-ethyl-N-[3'-(1''-phenyl-cyclohexyl)-propyl]-β-(3,4-dichloro-phenyl)-ethylamine in the form of colorless crystals which melted at 129° C.

$C_{25}H_{33}Cl_2N \cdot C_2H_2O_4$ (M.W. 508.5).—Calculated, percent: C, 63.77; H, 6.93; N, 2.76; Cl, 13.94. Found, percent: C, 63.63; H, 6.98; N, 2.82; Cl, 13.87.

EXAMPLE 54

N-[2'-(1"-p-chlorophenyl-cyclohexyl)-ethyl]-β-(3,4-dichlorophenyl)-ethylamine 24.9 g. N-[2'-(1"-chlorophenyl-cyclohexyl)-ethyl]-3,4-dichlorophenyl-acetamide (colorless crystals with a melting point of 115–118° C.) were dissolved in 150 ml. anhydrous ether, added dropwise to a suspension of 3.35 g. lithium aluminum hydride in 100 ml. anhydrous ether and the resultant mixture heated under reflux for 2 hours. After decomposition of the excess lithium aluminum hydride with water and separation of the aluminum hydroxide which had formed, the ether was distilled off yielding 24.68 g. of residue which was again dissolved in ether and reacted with maleic acid. The yield amounted to 12.5 g. The unreduced starting material was recovered from the mother liquor. After recrystallization from ethyl acetate/methylene chloride, there was obtained the maleate of N - [2' - (1" - p - chlorophenyl - cyclohexyl) - ethyl-β-(3,4-dichlorophenyl)-ethylamine in the form of colorless crystals which melted at 163–164° C.

$C_{22}H_{26}Cl_3N \cdot C_4H_4O_4$ (M.W. 526.9).—Calculated, percent: C, 59.26; H, 5.74; N. 2.66; Cl, 20.18. Found, percent: C, 59.20; H, 5.86; N, 2.71; Cl, 20.13.

EXAMPLE 55

N-ethyl-N-[2'-(1"-p-chlorophenyl-cyclohexyl-ethyl]
β-(3,4-dichlorophenyl)-ethylamine The procedure described in Example 51 was repeated. 6.4 g. N-[2'-(1"-p-chlorophenyl-cyclohexyl)-ethyl]-β-(3,4-dichlorophenyl)-ethylamine, in the form of the free base, were acetylated and reduced with lithium aluminum hydride in ether. There were obtained 6.1 g. of crude product which was converted into the salt with oxalic acid in ether. After recrystallization from isopropanol, the oxalate of N-ethyl-N-[2'-(1"-p-chlorophenyl-cyclohexyl) ethyl]-β-(3,4-dichlorophenyl)-ethylamine was obtained in the form of colorless crystals which melted at 149° C.

$C_{24}H_{30}Cl_3N \cdot C_2H_2O_4$ (M.W. 528.9)—Calculated, percent: C, 59.04; H, 6.10; N, 2.65. Found, percent: C, 59.13; H, 6.21; N, 2.61.

EXAMPLE 56

N-[3'-(1"-phenyl-cyclohexyl)-propyl]-β-(3,4-methylenedioxy-phenyl)-ethylamine

In a manner analogous to that described in Example 38, 28 g. N-[β-(1 - phenyl-cyclohexyl)-propionyl] - β - (3,4-methylenedioxy - phenyl) - ethylamine (colorless, viscous oil) were reduced with 5.62 g. lithium aluminum hydride in ether and further worked up. There were obtained 25.9 g. of a colorless oil which was converted into the salt with maleic acid in ether. There were obtained 23.6 g. of the maleate of N-[3'-(1"-phenyl-cyclohexyl)-propyl]-β-(3,4-methylenedioxy-phenyl)-ethylamine which, following recrystallization from isopropanol, formed colorless crystals which melted at 157° C.

$C_{24}H_{31}NO_2 \cdot C_4H_4O_4$ (M.W. 481.6)—Calculated, percent: C, 69.83; H, 7.32; N, 2.91. Found, percent: C, 69.89; H, 7.42; N, 3.03.

EXAMPLE 57

N-ethyl-N-[3'-(1"-phenyl-cyclohexyl)-propyl]-β-(3,4-methylenedioxy-phenyl)-ethylamine In a manner analogous to that described in Example 51, the base obtained from 11.7 g. of the maleate of N-[3'-(1"-phenyl - cyclohexyl)-propyl]-β-(3,4-methylenedioxy-phenyl)-ethylamine was acetylated and reduced with lithium aluminum hydride in ether. There were obtained 9.78 g. of residue which was converted in the conventional manner into the oxalate. After recrystallization from ethyl acetate, there was obtained the oxalate of N-ethyl-N-[3'-(1"-phenyl - cyclohexyl)-propyl]-β-(3,4-methylenedioxy-phenyl)-ethylamine in the form of colorless crystals which melted at 130° C.

$C_{26}H_{35}NO_2 \cdot C_2H_2O_4$ (M.W. 483.6)—Calculated, percent: C, 69.54; H, 7.71; N, 2.89. Found, percent: C, 68.99; H, 7.66; N, 2.91.

EXAMPLE 58

N-[3'-(1"-p-chlorophenyl-cyclohexyl)-propyl]-β-(3,4-methylenedioxy-phenyl)-ethylamine According to the procedure described in Example 38, 19 g. N-[β-(1'-p-chlorophenyl - cyclohexyl)propionyl]-β-(3,4-methylenedioxy - phenyl)-ethylamine (colorless, viscous oil) were reduced with 3.5 g. lithium aluminum hydride in ether and the reaction mixture worked up. There were thusly obtained 17.7 g. of a colorless oil which was converted into the salt by reaction with maleic acid in ether. After recrystallization from ethyl acetate/methylene chloride, the colorless maleate of N-[3'-(1"-p-chlorophenyl-cyclohexyl) - propyl] - β - (3,4 - methylenedioxyphenyl)-ethylamine so obtained melted at 154° C.

$C_{24}H_{30}ClNO_2 \cdot C_4H_4O_4$ (M.W. 516.02) — Calculated, percent: C, 65.17; H, 6.64; Cl 6.87; N, 2.71. Found, percent: C, 65.34; H, 6.67; Cl 7.01; N, 2.67.

EXAMPLE 59

N-ethyl-N-[3'-(1"-p-chlorophenyl-cyclohexyl)-propyl] β-(3,4-methylenedioxy-phenyl)-ethylamine In a manner analogous to that described in Example 51, the base obtained from 10.4 g. of the maleate of N-[3'-(1" - p - chlorophenyl-cyclohexyl)-propyl]-β-(3,4-methylenedioxy-phenyl)-ethylamine was acetylated and reduced with lithium aluminum hydride in ether. 8.34 g. of oily residue were obtained and, following the working-up of the reaction mixture, were converted into the salt by reacting with oxalic acid in ether. After recrystallization from ethyl acetate, the oxalate of N-ethyl-N-[3'-(1"-p-chlorophenyl-cyclohexyl) - propyl] - β - (3,4 - methylenedioxy-phenyl)-ethylamine was obtained in the form of colorless crystals which melted at 90–100° C.

$C_{26}H_{34}ClNO_2 \cdot C_2H_2O_4$ (M.W. 518.0)—Calculated, percent: C, 64.92; H, 7.01; N, 2.70; Cl, 6.84. Found, percent: C, 64.73; H, 7.16; N, 2.80; Cl, 6.90.

EXAMPLE 60

N-[3'-(1"-phenyl-cyclohexyl)-propyl]-β-(4-benzyloxyphenyl)-ethylamine

In a manner analogous to that described in Example 38, 40 g. N-[β-(1'-phenyl-cyclohexyl) - propionyl]-β-(4-benzyloxy-phenyl)-ethylamine (colorless crystals having a melting point of 111° C., after recrystallization from diisopropyl ether) were reduced with 5.2 g. lithium aluminum hydride in an ether-tetrahydrofuran mixture (1:1) and the reaction mixture then further worked up. There were obtained 38.5 g. residue which was dissolved in ether and converted into the maleate. There were obtained 29.3 g. of the maleate of N-[3'-(1"-phenyl-cyclohexyl)-propyl] β-(4-benzyloxyphenyl)-ethylamine which, after recrystallization from ethyl acetate/methylene chloride, was in the form of colorless crystals melting at 172° C.

$C_{30}H_{37}NO \cdot C_4H_4O_4$ (M.W. 543.7)—Calculated, percent: C, 75.10; H, 7.61; N, 2.58. Found, percent: C, 74.90; H, 7.79; N, 2.66.

EXAMPLE 61

N-ethyl-N-[3'-(1"-phenyl-cyclohexyl)-propyl]-β-(4-benzyloxy-phenyl)-ethylamine

In a manner analogous to that described in Example 51, the base prepared from 16.9 g. of the maleate of N-[3'-(1"-phenyl-cyclohexyl)-propyl] - β - (4-benzyloxyphenyl)-ethylamine was acetylated and reduced with lithium aluminum hydride. The 13.9 g. of oily residue so obtained were dissolved in ether and converted into the oxalate. After recrystallization from ethyl acetate, there was obtained the oxalate of N-ethyl - N - [3'-(1'-phenyl-cyclohexyl)-propyl] - β-(4-benzyloxy-phenyl)-ethylamine as colorless crystals having a melting point of 88–89° C. and in a yield of 15.95 g.

$C_{32}H_{41}NO \cdot C_2H_2O_4$ (M.W. 545.7).—Calculated, percent: C, 74.83; H, 7.94; N, 2.57. Found, percent: C, 74.20; H, 7.98; N, 2.54.

Equivalent weight: found 546.

EXAMPLE 62

N-[2'-(1''-phenyl-cyclohexyl)-ethyl]-1-phenyl-2-aminoethanol

In a manner analogous to that described in Example 38, 23.7 g. N-[2-(1'-phenyl-cyclohexyl)-ethyl]-O-acetyl-mandelic acid amide (colorless crystals having a melting point of 128° C., after recrystallization from diisopropyl ether) were heated under reflux with 3.8 g. lithium aluminum hydride in 600 ml. ether-tetrahydrofuran (1:1) for 5.5 hours and then further worked up. There were obtained 23.2 g. of crude product, a portion of which, however, consisted of N - [2 - (1' - phenyl-cyclohexyl)-ethyl]-mandelic acid amide. The desired product was separated in ether as the maleate. After recrystallization from isopropanol, the colorless maleate of N-[2'-(1''-phenyl-cyclohexyl)-ethyl] - 1 - phenyl - 2 - aminoethanol melted at 170–171° C.

$C_{22}H_{29}NO \cdot C_4H_4O_4$ (M.W. 439.5).—Calculated, percent: C, 71.05; H, 7.57; N, 3.18. Found, percent: C, 70.90; H, 7.72; N, 3.19.

EXAMPLE 63

N-ethyl-N-[3'-(1''-phenyl-cyclohexyl)-propyl]-1-(3''', 4'''-dichlorophenyl)-2-aminoethanol In a manner analogous to that described in Example 51, 18.7 g. of the N-[3-(1'-phenyl-cyclohexyl)-propyl]-1-(3''',4'''-dichlorophenyl) - 2 - aminoethanol prepared according to Example 42 (colorless crystals having a melting point of 80° C., after recrystallization from diisopropyl ether) were acetylated and then reduced with 2.8 g. lithium aluminum hydride in ether. After working up the ethereal solution, there were obtained 18.6 g. of residue which was converted into the oxalate. After recrystallization from isopropanol, the oxalate of N-ethyl-N-[3'-(1''-phenyl-cyclohexyl)-propyl] - 1 - (3''',4'''-dichlorophenyl)-2-aminoethanol was obtained in the form of colorless crystals which melted at 134–136° C.

$C_{25}H_{33}Cl_2NO \cdot C_2H_2O_4$ (M.W. 524.5).—Calculated, percent: C, 61.82; H, 6.72; N, 2.67; Cl, 13.52. Found, percent: C, 62.31; H, 7.04; N, 2.72; Cl, 13.56.

EXAMPLE 64

N-[3'-(1''-phenyl-cyclohexyl)-propyl]-1-(3''',4'''-methylenedioxy-phenyl)-2-aminoethanol In a manner analogous to that described in Example 38, 26 g. N-[β-(1'-phenyl-cyclohexyl)-propionyl]-1-(3'', 4''-methylenedioxy-phenyl) - 2-aminoethanol (colorless crystals having a melting point of 106–108° C., following recrystallization from diisopropyl ether) were heated under reflux for 4 hours with 4 g. lithium aluminum hydride in 500 ml. ether and 100 ml. tetrahydrofuran and then worked up further. There were obtained 24.7 g. of residue which, after recrystallization from diisopropyl ether, formed crystals. There were obtained colorless crystals of N-[3'-(1''-phenyl-cyclohexyl)-propyl]-1-(3''',4'''-methylenedioxy-phenyl)-2-aminoethanol which melted at 100–102° C.

$C_{24}H_{31}NO_3$ (M.W. 381.5).—Calculated, percent: C, 75.55; H, 8.19; N, 3.67. Found, percent: C, 78.85; H, 8.31; N, 3.77.

The maleate prepared in the conventional manner from the crude base melted, after recrystallization from ethyl acetate/methylene chloride, at 129–131° C.

$C_{24}H_{31}NO_3 \cdot C_4H_4O_4$ (M.W. 497.6).—Calculated, percent: C, 67.58; H, 7.09; N, 2.81. Found, percent: C, 67.71; H, 7.29; N, 2.86.

EXAMPLE 65

N-ethyl-N-[3'-(1''-phenyl-cyclohexyl)-propyl]-1-(3''', 4'''-methylenedioxy-phenyl)-2-aminoethanol In a manner analogous to that described in Example 51, 10.1 g. N-[3'-(1''-phenyl-cyclohexyl)-propyl]-1-(3''', 4'''-methylenedioxy-phenyl)-2-aminoethanol, in the form of the free base, were acetylated and reduced with 1.7 g. lithium aluminum hydride in 300 ml. ether. The 10.6 g. of residue obtained after working up the ethereal solution were converted into the oxalate. After recrystallization from ethyl acetate/methylene chloride, there was obtained the oxalate of N-ethyl - N - [3'-(1''-phenyl-cyclohexyl)-propyl] - 1 - (3''',4'''-methylenedioxy-phenyl)-2-aminoethanol in the form of colorless crystals having a melting point of 104–110° C.

$C_{26}H_{35}NO_3 \cdot C_2H_2O_4$ (M.W. 499.6).—Calculated, percent: C, 67.31; H, 7.46; N, 2.80. Found, percent: C, 67.41; H, 7.59; N, 2.80.

EXAMPLE 66

N-ethyl-N-[2'-(1''-phenyl-cyclohexyl)-ethyl]-1-amino-2-hydroxy-3-(m-methyl-phenoxy)-propane 4.8 g. N-[2 - (1'-phenyl-cyclohexyl)-ethyl]-ethylamine (colorless oil; B.P. 135–138° C./0.4 mm. Hg) and 4.5 g. 3-(m-methyl-phenoxy)-1,2-propylene oxide were allowed to stand together for 12 hours at room temperature. After the addition of 50 ml. ether, an excess of oxalic acid was added thereto and the oxalate which formed filtered off with suction. After recrystallization from isopropanol, there were obtained 8.9 g. of colorless crystals of the oxalate of N-ethyl-N-[2'-(1''-phenyl-cyclohexyl)-ethyl]-1-amino-2-hydroxy-3-(m-methyl-phenoxy)-propane which melted at 120–122° C.

$C_{26}H_{37}NO_2 \cdot C_2H_2O_4$ (M.W. 485.6).—Calculated, percent: C, 69.25; H, 8.10; N, 2.88. Found, percent: C, 69.30; H, 8.14; N, 2.9.

EXAMPLE 67

N-ethyl-N-[2'-(1''-p-chlorophenyl-cyclohexyl)-ethyl]-1-amino-2-hydroxy-3-(m-methyl-phenoxy)-propane In a manner analogous to that described in Example 66, 10.4 g. N-[2-(1'-p-chlorophenyl-cyclohexyl)-ethyl]-ethylamine (colorless oil; B.P. 155–162° C./0.5 mm. Hg) were reacted with 7 g. 3-(m-methyl-phenoxy)-1,2-propylene oxide. The reaction mixture was taken up in 50 ml. ether and acidified with oxalic acid. In this manner, there were obtained 17.2 g. of the oxalate of N-ethyl-N-[2'-(1''-p-chlorophenyl-cyclohexyl)-ethyl]-1-amino - 2 - hydroxy-3-(m-methyl-phenoxy)-propane in the form of colorless crystals which melted at 143–145° C.

$C_{26}H_{36}ClNO_2 \cdot C_2H_2O_4$ (M.W. 520.05).—Calculated, percent: C, 64.66; H, 7.37; N, 2.69; Cl, 6.82. Found, percent: C, 64.52; H, 7.46; N, 2.62; Cl, 6.84.

EXAMPLE 68

N-ethyl-N-[2'-(1''-phenyl-cyclohexyl)-ethyl]-β-(3,4-dimethoxy-phenyl)-ethylamine In a manner analogous to that described in Example 49, 13 g. N-ethyl-N-[2'-(1''-phenyl-cyclohexyl)-ethyl]-3,4-dimethoxy-phenyl-acetamide (colorless, viscous oil; prepared from 3,4-dimethoxy-phenyl-acetyl chloride and N-ethyl-2-(1'-phenyl-cyclohexyl)-ethylamine) were dissolved in 100 ml. anhydrous ether, reduced with 1.8 g. lithium aluminum hydride in 100 ml. ether and further worked up. From the working up of the ethereal solution, there were obtained about 12 g. of residue which was converted into the oxalate with the calculated amount of oxalic acid. Following recrystallization from ethyl acetate/methylene chloride, there was obtained the oxalate of N-ethyl-N-[2'-(1''-phenyl-cyclohexyl) - ethyl] - β - (3,4 - dimethoxy-phenyl)-ethylamine in the form of colorless crystals which melted at 140–142° C.

$C_{26}H_{37}NO_2 \cdot C_2H_2O_4$ (M.W. 485.6).—Calculated, percent: C, 69.25; H, 8.10; N, 2.88. Found, percent: C, 69.05; H, 8.20; N, 3.11.

Equivalent weight found: 478.

EXAMPLE 69

N-[3'-(1''-p-chlorophenyl-cyclohexyl)-propyl]-β-(3,4-dimethoxy-phenyl)-ethylamine In a manner analogous to that described in Example 38, 30.6 g. N-[β-(1'-p-chlorophenyl-cyclohexyl)-propionyl]-β-(3,4-dimethoxy-phenyl)-ethylamine (colorless oil) were dissolved in 350 ml. anhydrous tetrahydrofuran, reduced with 5.5 g. lithium aluminum hydride in 350 ml. anhydrous tetrahydrofuran and worked up. The crude base obtained was converted into the maleate in the conventional manner. The yield amounted to 27.8 g. After recrystallization from ethyl acetate, the maleate of N-[3'-(1''-p-chlorophenyl-cyclohexyl)-propyl]-β-(3,4-dimethoxy-phenyl)-ethylamine was obtained in the form of colorless crystals melting at 122° C.

$C_{25}H_{34}ClNO_2 \cdot C_4H_4O_4$ (M.W. 532.0).—Calculated, percent: C, 65.47; H, 7.20; N, 2.63; Cl, 6.66. Found, percent: C, 64.99; H, 7.13; N, 3.01; Cl, 6.68.

EXAMPLE 70

N-[2'-(1''-p-chlorophenyl-cyclohexyl)-ethyl]-β-(3,4-dimethoxy-phenyl)-ethylamine Following the procedure described in Example 49, 42 g. N-[2'-(1''-p-chlorophenyl-cyclohexyl)-ethyl]-3,4-dimethoxy-phenyl-acetamide (colorless oil) were dissolved in 300 ml. anhydrous tetrahydrofuran, reduced with 8.1 g. lithium aluminum hydride in 400 ml. anhydrous tetrahydrofuran and worked up. The 40.5 g. of crude base thereby obtained were converted into the oxalate with oxalic acid in ether. After recrystallization from ethanol, there was obtained the oxalate of N-[2'-(1''-p-chlorophenyl-cyclohexyl)-ethyl]-β-(3,4-dimethoxy-phenyl)-ethylamine in the form of colorless crystals which melted at 186° C.

$C_{24}H_{32}ClNO_2 \cdot C_2H_2O_4$ (M.W. 492.0).—Calculated, percent: C, 63.47; H, 6.97; Cl, 7.21; N, 2.85. Found, percent: C, 62.93; H, 7.03; Cl, 7.30; N, 2.83.

EXAMPLE 71

N-ethyl-N-[2'-(1''-p-chlorophenyl-cyclohexyl)-ethyl]-1-phenyl-2-aminoethanol 5.3 g. styrene oxide and 8.7 g. N-ethyl-2-(1'-p-chlorophenyl-cyclohexyl)-ethylamine (colorless oil; B.P. 155–162° C./0.5 mm. Hg) were mixed with 3 drops of water and left to stand for 4 days at room temperature. The reaction mixture was then taken up in ether, dried over anhydrous sodium sulfate and mixed with the calculated amount of oxalic acid in ether. The 14.6 g. of oxalate so obtained were recrystallized from isopropanol/methylene chloride. There were thereby obtained colorless crystals of the oxalate of N-ethyl-N-[2'-(1''-p-chlorophenyl-cyclohexyl)-ethyl]-1-phenyl-2-aminoethanol which melted at 145–149° C.

$C_{24}H_{32}ClNO \cdot C_2H_2O_4$ (M.W. 480.0).—Calculated, percent: C, 65.06; H, 7.98; N, 2.92; Cl, 7.39. Found, percent: C, 65.47; H, 7.59; N, 3.18; Cl, 7.65.

The new phenyl-cyclohexylalkylamines and their salts can be used as medicaments, for example in the form of pharmaceutical preparations which contain the active substance in admixture with an organic or inorganic, solid or liquid carrier material suitable for enteral or parenteral administration. As carrier material there come into consideraiton those substances which do not react with the new compounds, such as for example water, gelatine, lactose, starches, colloidal silicic acid, magnesium stearate, talc, vegetable oils, benzyl alcohols, gums, polyalkylene glycols, cholesterol or other known carriers. The pharmaceutical preparations can be for example in the form of tablets, dragees or in liquid form as solutions, suspensions or emulsions. They may also be sterilized and/or contain auxiliary substances, such as preserving agents, stabilizing agents, wetting agents or emulsifying agents, salts to alter the osmotic pressure or buffers. They may also contain other therapeutically valuable substances.

In order to establish the efficacy and valuable properties of the compounds of the invention as coronary artery dilating agents, the following compounds were evaluated in a series of experiments for determining cardiovascular effects such as coronary dilation and depression of hypertensive blood pressure levels:

(1) Segontin=N-[3'-phenyl-propyl-(2')]-1,1-diphenyl-propyl-(3)-amine
(2) Ex. 1=1-[3'-(phenylisopropylamino)-propyl]-1-phenylcyclohexane
(3) Ex. 2=1-[2'-(phenylisopropylamino)-ethyl]-1-phenylcyclohexane
(4) Ex. 3=1-[2'-(3'',4''-methylenedioxy-phenylisopropyl-amino)-ethyl]-1-phenylcyclohexane
(5) Ex. 4=1-[3'-(3'',4''-methylenedioxy-phenylisopropylamino)-propyl]-1-phenyl-cyclohexane
(6) Ex. 5=1-[3'-(N-methyl-N-3'',4''-methylenedioxy-phenylisopropyl)-aminopropyl]-1-phenylcyclohexane
(7) Ex. 6=1-[3'-(p-benzyloxyphenylisopropylamino)-propyl]-1-phenylcyclohexane
(8) Ex. 7=1-[2'-(p-benzyloxyphenylisopropylamino)-ethyl]-1-phenylcyclohexane
(9) Ex. 8=1-[2'-(p-hydroxyphenylisopropylamino)-ethyl]-1-phenylcyclohexane
(10) Ex. 9=1-[3'-(3'',4''-dimethoxyphenylisopropyl-amino)-propyl]-1-phenylcyclohexane
(11) Ex. 11=1-[3'-(4''-chlorophenyl-isopropylamino)-propyl]-1-phenyl-cyclohexane
(12) Ex. 13=1-[2'-(4''-chlorophenyl-isopropylamino)-ethyl]-1-phenyl-cyclohexane
(13) Ex. 14=1-[3'-(3'',4''-dichlorophenyl-isopropyl-amino)-propyl]-1-phenylcyclohexane
(14) Ex. 10=1-[3'-(4''-methylphenyl-isopropylamino)-propyl]-1-phenylcyclohexane
(15) Ex. 20=1-[3'-(4''-chlorophenyl-isopropylamino)-propyl]-1-(4'''-methyl-phenyl)cyclohexane
(16) Ex. 22=1-[3'-(4''-methylphenyl-isopropylamino)-propyl]-1-(4'''-methoxyphenyl)-cyclohexane
(17) Ex. 17=1-[3'-(4''-methylphenyl-isopropylamino)-propyl]-1-(4'''-methyl-phenyl)-cyclohexane
(18) Ex. 15=1-[3'-(phenyl-isopropylamino)-propyl]-1-(4'''-methyl-phenyl)-cyclohexane
(19) Ex. 21=1-[3'-(3'',4''-dichlorophenyl-isopropyl-amino)-propyl]-1-(4'''-methyl-phenyl)-cyclohexane
(20) Ex. 19=1-[3'-(3'',4''-methylenedioxy-phenyl-isopropylamino)-propyl]-1(4'''-methyl-phenyl)-cyclohexane
(21) Ex. 16=1-[3'-(N-methyl-N-phenyl-isopropyl)-amino propyl]-1-(4'''-methyl-phenyl)-cyclohexane
(22) Ex. 24=1-[3'-(3'',4''-methylenedioxy-phenyl-isopropylamino)-propyl]-1-(4'''-chlorophenyl)-cyclohexane
(23) Ex. 18=1-[3'-(3'',4''-dimethoxyphenyl-isopropylamino)-propyl]-1-(4'''-methyl-phenyl)-cyclohexane
(24) Ex. 25=1-[3'-(3'',4''-dichlorophenyl-isopropylamino)-propyl]-1-(4'''-chlorophenyl)-cyclohexane
(25) Ex. 23=1-[2'-(3'',4''-methylenedioxy-phenyl-isopropylamino)-ethyl]-1-(4'''-methoxy-phenyl)-cyclohexane
(26) Ex. 26=1-[3'-(3'',4'',5''-trimethoxyphenyl-isopropylamino)-propyl]-1-(4'''-chlorophenyl)-cyclohexane
(27) Ex. 27=1-[3'-(4''-benzyloxyphenyl-isopropylamino)-propyl]-1-(4'''-chlorophenyl)-cyclohexane
(28) Ex. 28=1-[3'-4''-hydroxyphenyl-isopropylamino)-propyl]-1-(4'''-chlorophenyl)-cyclohexane

(29) Ex. 29=1-[3'-(phenyl-isopropylamino)-propyl]-1-(4''-chlorophenyl)-cyclohexane
(30) Ex. 31=1-[3'-(N-ethyl-N-3'',4''-methylenedioxy-phenyl-isopropylamino)-propyl]-1-phenyl-cyclohexane
(31) Ex. 34=(+)-1-[3'-(3'',4''-methylenedioxyphenyl-isopropylamino)-propyl]-1-phenyl-cyclohexane The following test procedures were utilized:

(1) Vasodilating effect on the isolated guinea pig heart by the method of Langendorff.
(2) Vasodilating effect on the hind leg of the rabbit with circulation "in situ."
(3) Blood pressure reducing effect on the rabbit after intraveneous injection.

In all of the experiments, Segontin=N - [3' - phenyl-propyl-(2')]-1,1-diphenyl-propyl-(3)-amine was used as the standard, and, by the administration of different dosages, the amounts of Segontin and test substance were determined which produced the same effect. The results of the experiments are set out in the table which follows: In the first three columns of the table effectiveness of the test compound is set out in the percentage of that of Segontin.

As the compounds are to be used as coronary dilators, the most important determination is the ratio between the coronary dilating effect and the general vasodilatation or blood pressure drop. In the last two columns of the table, the coronary specificity has been calculated from the relation of the effect on the heart's circulation to that on the circulation of the hind leg and on the blood pressure.

In the table, all the values have been underscored which are shown to be more advantageous over Segontin. On the Langendorff heart experiment all of the products, with the exception of 9, 10 and 25 were clearly more effective than Segontin. The effect of 8 was equal in intensity to that of Segontin, but it continued 3 to 5 times longer, so that it is also therapeutically superior to Segontin.

VASCULAR DILATING AND BLOOD PRESSURE REDUCING EFFECT IN COMPARISON TO SEGONTIN

| Substance No. | Vascular dilation | | Blood pressure | Heart leg | Coronary specificity, heart blood pressure |
|---|---|---|---|---|---|
| | Heart | Leg | | | |
| Segontin 1 | 100 | 100 | 100 | 1.0 | 1.0 |
| PL 2 | 127 | 44 | 420 | 2.9 | 0.3 |
| PL 3 | 170 | 57 | 70 | 3.0 | 2.4 |
| PL 4 | 154 | 49 | 68 | 3.1 | 2.3 |
| PL 5 | 142 | 72 | 81 | 2.0 | 1.8 |
| PL 6 | 278 | 120 | 94 | 2.3 | 2.9 |
| PL 7 | 209 | 25 | 54 | 8.4 | 3.9 |
| PL 8 | [1] 102 | 63 | 62 | 1.6 | 1.6 |
| PL 9 | 70 | 35 | 55 | 2.0 | 1.3 |
| PL 10 | 66 | 76 | 77 | 0.8 | 0.9 |
| PL 11 | 108 | 96 | 58 | 1.1 | 1.9 |
| PL 12 | 258 | 42 | 52 | 6.2 | 5.0 |
| PL 13 | 247 | 38 | 44 | 6.5 | 5.6 |
| PL 14 | 280 | 100 | 40 | 2.8 | 7.0 |
| PL 15 | 319 | | | | |
| PL 16 | 135 | | | | |
| PL 17 | 211 | | | | |
| PL 18 | 360 | | | | |
| PL 19 | 216 | | | | |
| PL 20 | 384 | | | | |
| PL 21 | 183 | | | | |
| PL 22 | 375 | | | | |
| PL 23 | 234 | | | | |
| PL 24 | 206 | | | | |
| PL 25 | 70 | 33 | 64 | 2.1 | 1.1 |
| PL 26 | 370 | 55 | 135 | 6.7 | 2.8 |
| PL 27 | 250 | 18 | 13 | 14 | 19 |
| PL 28 | 240 | | | | |
| PL 29 | [2] 350 | | | | |
| PL 30 | 201 | 85 | 65 | 2.4 | 3.1 |
| PL 31 | 142 | 72 | 81 | 2.0 | 1.8 |

[1] Works 3 to 5 times longer than Segontin.
[2] Works 2 times longer than Segotin.

We claim:
1. A compound of the formula

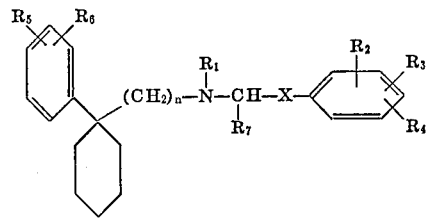

wherein $R_1$ is selected from the group consisting of hydrogen and lower alkyl, $R_2$, $R_3$, $R_4$, $R_5$, and $R_6$ are each selected from the group consisting of hydrogen, chlorine, hydroxyl, lower alkyl, benzyloxy, methoxy, and methylenedioxy formed by two adjacent $R_2$–$R_6$ groups attached together, X is selected from the group consisting of alkylene having 1 to 3 carbon atoms, keto-substituted alkylene having 1 to 3 carbon atoms, hydroxyl-substituted alkylene having 1 to 3 carbon atoms, keto- and hydroxyl-substituted alkylene having 1 to 3 carbon atoms, and said alkylene group members interrupted by an oxygen atom, $R_7$ is selected from the group consisting of hydrogen and lower alkyl and $n$ is an integer of 2 to 3 and the non-toxic acid addition salts thereof.

2. A compound of the formula

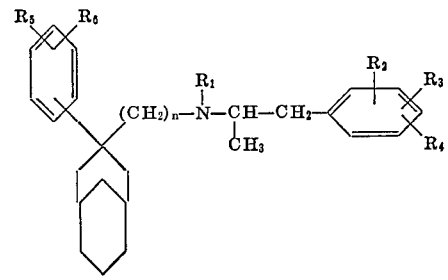

wherein $R_1$ is selected from the group consisting of hydrogen and lower alkyl, $R_2$, $R_3$, $R_4$, $R_5$, and $R_6$ are each selected from the group consisting of hydrogen, chlorine, hydroxyl, lower alkyl, benzyloxy, methoxy, and methylenedioxy formed by two adjacent $R_2$ to $R_6$ groups attached together, and $n$ is an integer of 2 to 3 and the non-toxic acid addition salts thereof.

3. A compound of the formula

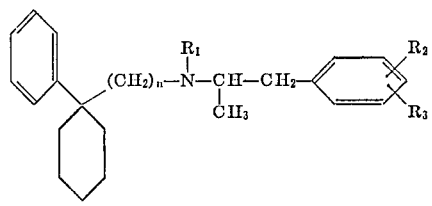

wherein $R_1$ is selected from the group consisting of hydrogen and lower alkyl, $R_2$ and $R_3$ are each selected from the group consisting of hydrogen chlorine, hydroxyl, lower alkyl, benzyloxy, methoxy, and methylenedioxy formed by two adjacent $R_2$ and $R_3$ groups attached together, and $n$ is an integer of 2 to 3 and the non-toxic acid addition salts thereof.

4. A compound of the formula

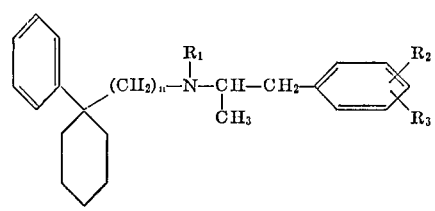

wherein $R_1$ is a member selected from the group consisting of hydrogen and lower alkyl, $R_2$ and $R_3$ are each selected from the group consisting of hydrogen, hydroxy, methoxy, benzyloxy, and methylenedioxy formed by two adjacent $R_2$ and $R_3$ groups attached together, and $n$ is an integer of 2 to 3 and the non-toxic acid addition salts thereof.

5. 1-[3-(phenylisopropylamino)-propyl]-1-phenylcyclohexane.

6. 1-[3'-(3",4"-methylenedioxy-phenylisopropylamino)-propyl]-1-phenylcyclohexane.

7. 1 - [3' - (N-methyl-N-3",4"-methylenedioxy-phenylisopropyl)-aminopropyl]-1-phenylcyclohexane.

8. 1-[3'-(N-ethyl-N-3",4"-methylenedioxyphenylisopropylamino)-propyl]-1-phenylcyclohexane.

9. 1 - [3' - (N-ethyl-N-4"-benzyloxyphenylisopropylamino)-propyl]-1-phenylcyclohexane.

10. (+)-1-[3'-(3",4"-methylenedioxyphenylisopropylamino)-propyl]-1-phenylcyclohexane.

11. 1-[3'-(N-methyl-N-phenyl-isopropyl)-aminopropyl]-1-(4"-methyl-phenyl)-cyclohexane.

12. N-methyl-N-[2"-hydroxy-2"-(3'",4'"-dichlorophenyl-ethyl]-1-phenyl-1-(3'-aminopropyl)-cyclohexane.

13. N - [2"-hydroxy-3"-(m-methylphenoxy)propyl]-1-phenyl-1-(3'-aminopropyl)-cyclohexane.

14. d - N - methyl-N-[2"-(1'"-hydroxy-1'"-phenylpropyl]-1-phenyl-1-(3'-aminopropyl)-cyclohexane.

15. N - [2" - (3'",4'" - dichlorophenyl)ethyl]-1-(1-p-chlorophenyl)-1-(2'-aminoethyl)-cyclohexane.

16. N - ethyl-N-[2"-(3'",4'"-dichlorophenyl)ethyl]-(1-p-chlorophenyl)-1-(2'-aminoethyl)-cyclohexane.

References Cited

UNITED STATES PATENTS 3,261,859  7/1966  Dengel _____ 260—340.5 X

NICHOLAS S. RIZZO, *Primary Examiner.*

J. H. TURNIPSEED, *Assistant Examiner.*

UNITED STATES PATENT OFFICE
CERTIFICATE OF CORRECTION

Patent No. 3,405,139                                         October 8, 1968

Erich Haack et al.

It is certified that error appears in the above identified patent and that said Letters Patent are hereby corrected as shown below:

In the heading to the printed specification, line 5, "Hesse' should read -- Hessen --. Column 1, line 38, "and chemotherapeu should read -- are chemotherapeutic --. Column 2, lines 30 to 3 formula (III) should appear as shown below:

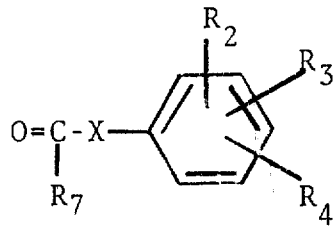

Column 4, line 49, "00 ml." should read-- 200 ml. --; line 65, "0.1 mol" should read -- 0.1 mol) --. Column 5, line 11, "residu" should read -- residue --; line 13, "the allowed" shoul read -- then allowed --. Column 7, line 27, "precipiated" shoul read -- precipitated --; line 31, "amount" should read -- amount --. Column 8, line 5, "N-n-propyl" should read -- (N-n-propyl - line 63, "methyl" should read -- methyl- --. Column 11, line 16 insert as a heading -- EXAMPLE 22 --; line 45, "mthylenedioxy" should read -- methylenedioxy --. Column 17, line 7, "melted," should read -- melted --; line 10, "melted," should read -- melted --. Column 18, line 13, "H, 6.89;" should read -- H, 6.84; --. Column 21, line 22, "ethyl" should read -- ethyl] --. Column 24, line 40, "N, 2.9" should read -- N, 2.94 --. Column 27, line 15, "intraveneous" should read -- intravenous --.

Signed and sealed this 10th day of March 1970.

(SEAL)
Attest:

EDWARD M. FLETCHER, JR.                         WILLIAM E. SCHUYLER, JR.
Attesting Officer                                Commissioner of Patents